United States Patent
Mae et al.

(10) Patent No.: US 8,582,951 B2
(45) Date of Patent: Nov. 12, 2013

(54) INFORMATION PROCESSING DEVICE, INFORMATION PROCESSING METHOD, AND COMPUTER PROGRAM

(75) Inventors: Atsushi Mae, Kanagawa (JP); Kenichiro Aridome, Kanagawa (JP); Yukio Isobe, Kanagawa (JP); Naoki Morimoto, Tokyo (JP)

(73) Assignee: Sony Corporation, Tokyo (JP)

( * ) Notice: Subject to any disclaimer, the term of this patent is extended or adjusted under 35 U.S.C. 154(b) by 1023 days.

(21) Appl. No.: 12/089,456

(22) PCT Filed: Aug. 1, 2007

(86) PCT No.: PCT/JP2007/065098
§ 371 (c)(1),
(2), (4) Date: Apr. 7, 2008

(87) PCT Pub. No.: WO2008/018344
PCT Pub. Date: Feb. 14, 2008

(65) Prior Publication Data
US 2008/0212223 A1    Sep. 4, 2008

(30) Foreign Application Priority Data
Aug. 10, 2006  (JP) .................................. 2006-218764

(51) Int. Cl.
*H04N 9/80* (2006.01)
(52) U.S. Cl.
USPC ........................................... 386/241; 360/69
(58) Field of Classification Search
USPC ................. 386/124, 241, 29; 360/69
See application file for complete search history.

(56) References Cited

U.S. PATENT DOCUMENTS

| 7,502,543 B2* | 3/2009 | Kato .............................. 386/248 |
| 7,941,033 B2* | 5/2011 | Kato et al. .................... 386/248 |
| 2002/0135608 A1* | 9/2002 | Hamada et al. ............... 345/723 |

(Continued)

FOREIGN PATENT DOCUMENTS

| EP | 1 667 037 A1 | 6/2006 |
| EP | 1 667 153 A1 | 6/2006 |

(Continued)

OTHER PUBLICATIONS

Kelly et al., Blu-Ray0disc—a versatile format for recording high definition video, 2003, IEEE, TUPM 7.2, 2 pages.*

(Continued)

*Primary Examiner* — Peter Shaw
*Assistant Examiner* — Dao Ho
(74) *Attorney, Agent, or Firm* — Oblon, Spivak, McClelland, Maier & Neustadt, L.L.P.

(57) ABSTRACT

A data recording structure supporting an AVCHD format is provided. The data recording structure allows a playing process, an editing process and a write-once recording process to be quickly performed. When data recording is performed in a data recording format having a layered management structure such as an AVCHD format, identification information is stored in an index file containing index information for record data. The identification information is needed to perform one of the playing process on the record data, the editing process on the record data and the write-once recording process on data. This arrangement eliminates the need for reading a variety of files and retrieving information when one of the record data playing process, the record data editing process and the write-once recording process is performed. Each process is thus quickly performed.

24 Claims, 15 Drawing Sheets

(56) References Cited

U.S. PATENT DOCUMENTS

| | | | |
|---|---|---|---|
| 2002/0150383 A1 | 10/2002 | Kato et al. | |
| 2003/0228134 A1 | 12/2003 | Kim et al. | |
| 2004/0101283 A1* | 5/2004 | Seo et al. | 386/95 |
| 2005/0022072 A1* | 1/2005 | Park | 714/54 |
| 2007/0086727 A1* | 4/2007 | Tanaka et al. | 386/95 |
| 2007/0255727 A1 | 11/2007 | Hirose et al. | |
| 2007/0269187 A1* | 11/2007 | Morimoto et al. | 386/95 |
| 2008/0019671 A1* | 1/2008 | Marumori | 386/124 |
| 2008/0212223 A1* | 9/2008 | Mae et al. | 360/69 |

FOREIGN PATENT DOCUMENTS

| | | |
|---|---|---|
| EP | 1 672 534 A1 | 6/2006 |
| JP | 11-243529 | 9/1999 |
| JP | 11 243529 | 9/1999 |
| JP | 2002 56651 | 2/2002 |
| JP | 2002-56651 | 2/2002 |
| JP | 2005 4850 | 1/2005 |
| JP | 2005-4850 | 1/2005 |
| JP | 2005-20378 | 1/2005 |
| JP | 2006 30767 | 3/2006 |
| WO | 2006 030767 | 3/2006 |

OTHER PUBLICATIONS

Panasonic and Sony expand HD digital video camera recorder format "AVCHD" and commence joint licensing, Jul. 13, 2006, Sony, http://www.sony.net/SonyInfo/News/Press/200607/06-0713E/index.html, 3 pages.*

U.S. Appl. No. 12/067,941, filed Mar. 25, 2008, Mae, et al.

U.S. Appl. No. 12/089,610, filed Apr. 9, 2008, Mae, et al.

Extended European Search Report issued Jun. 18, 2012, in Patent Application No. 07791778.9.

"Guide to Obtain the AVCHD Format and Logo License—License Flow", AVCHD Format Co-Promoters, XP002634818, Jul. 19, 2006, pp. 1-5.

"Press Release—Panasonic and Sony Jointly Developed New HD Digital Video Camera Recorder Format for Recording on Disc", AVCHD Format Co-Promoters, XP 002634819, May 11, 2006, pp. 1-2.

* cited by examiner

FIG. 9

| Syntax | No. of bits | Mnemonic |
|---|---|---|
| Index. bdmv { | | |
|   TypeIndicator | 8 * 4 | bslbf |
|   TypeIndicator 2 | 8 * 4 | bslbf |
|   IndexeStartAddress | 32 | uimsbf |
|   ExtensionDataStartAddress | 32 | uimsbf |
|   reserved | 192 | bslbf |
|   ApplInfoBDMV () | | |
|   for (i = 0; i < N1; i++){ | | |
|     padding_word | 16 | bslbf |
|   } | | |
|   Indexes () | | |
|   for (i = 0; i < N2; i++){ | | |
|     padding_word | 16 | bslbf |
|   } | | |
|   blkExtensionData () | | |
|   for (i = 0; i < N3; i++){ | | |
|     padding_word | 16 | bslbf |
|   } | | |
| } | | |

FIG. 10

| Syntax | No. of bits | Mnemonic |
|---|---|---|
| ExtensionData( ) { | | |
|   length | 32 | uimsbf |
|   if(length != 0) { | | |
|     data_block_start_address | 32 | uimsbf |
|     reserved | 24 | bslbf |
|     number_of_ext_data_entries | 8 | uimsbf |
|     for (i = 0 ; i < number_of_ext_data_entries; i++) { | | |
|       ext_data_entry( ) { | | |
|         ID1 | 16 | uimsbf |
|         ID2 | 16 | uimsbf |
|         ext_data_start_address | 32 | uimsbf |
|         ext_data_length | 32 | uimsbf |
|       } | | |
|     for (i = 0 <; i < L1; i++) { | | |
|       padding_word | 16 | bslbf |
|       padding_word | 16 | bslbf |
|     } | | |
|     data_block | 32 + 8 * (length- data_block_ start_address) | |
|   } | | |
| } | | |

| Syntax | No. of bits | Mnemonic |
|---|---|---|
| indexExtensionData( ) { | | |
|   type_indicator | 8 * 4 | uimsbf |
|   reserved | 8 * 4 | bslbf |
|   TableOfPlayLists_start_address | 32 | uimsbf |
|   MakersPrivateData_start_address | 32 | uimsbf |
|   reserved_for_future_use | 192 | bslbf |
|   UIAppinfoAVCHD( ) | | |
|   for (i = 0; i < N1; i++) { | | |
|     padding_word | 16 | bslbf |
|   } | | |
|   TableOfPlayLists( ) | | |
|   for (i = 0; i < N2; i++) { | | |
|     padding_word | 16 | bslbf |
|   } | | |
|   MakersPrivateData( ) | | |
|   for (i = 0; i < N3; i++) { | | |
|     padding_word | 16 | bslbf |
|   } | | |
| } | | |

| Syntax | No. of bits | Mnemonic |
|---|---|---|
| MakersPrivateData() { | | |
|   length | 32 | uimsbf |
|   if(length != 0) { | | |
|     data_block_start_address | 32 | uimsbf |
|     reserved_for_word_align | 24 | bslbf |
|     number_of_maker_entries | 8 | uimsbf |
|     for (i = 0; i < number_of_maker_data_entries; i++) { | | |
|       maker_ID | 16 | uimsbf |
|       maker_model_code | 16 | uimsbf |
|       mpd_start_address | 32 | uimsbf |
|       mpd_length | 32 | uimsbf |
|     } | | |
|     for (i = 0 <; i < L1; i++) { | | |
|       padding_word | 16 | bslbf |
|       padding_word | 16 | bslbf |
|     } | | |
|     data_block | 32 + 8 * (length- data_block_ start_address) | |
|   } | | |
| } | | |

304

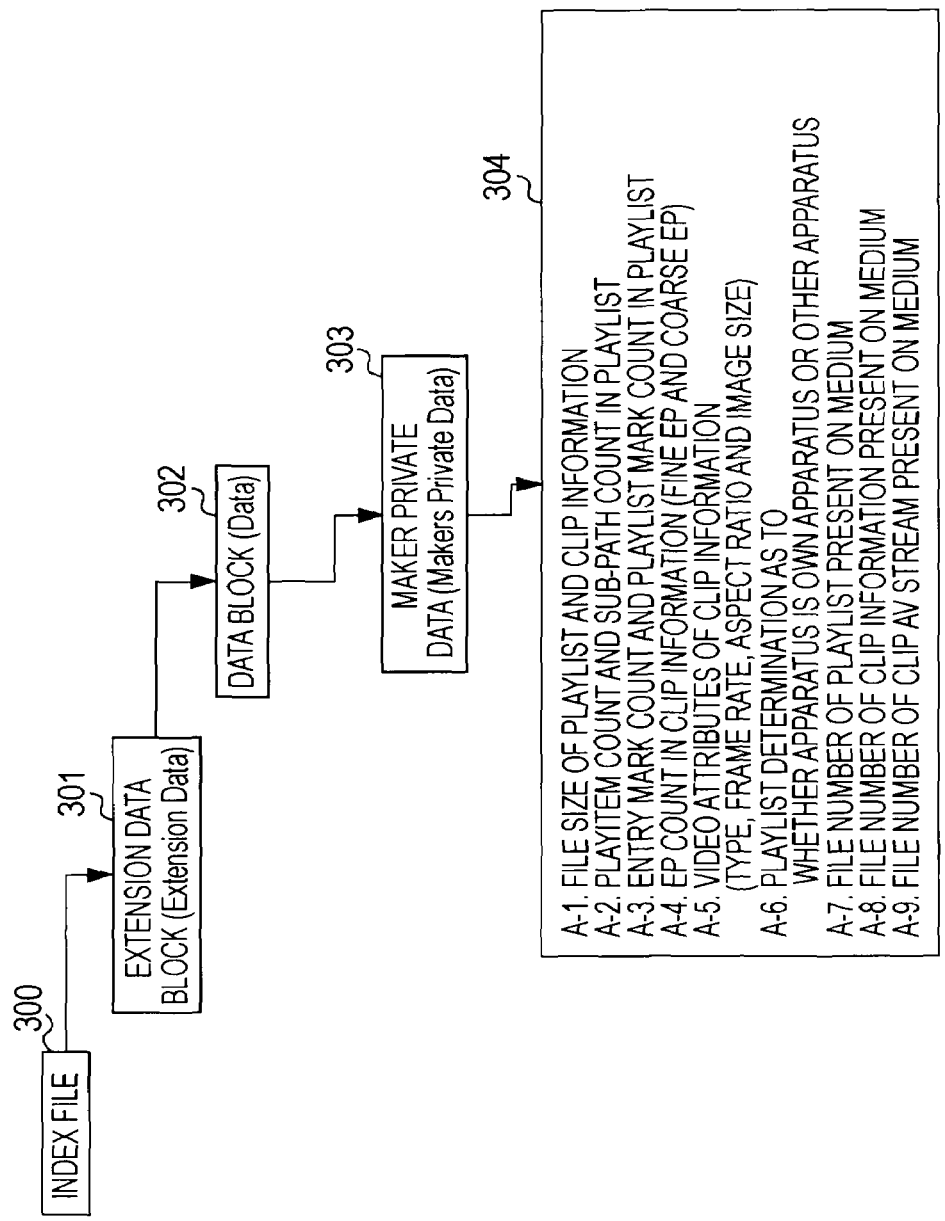

FIG. 14

| DATA SIZE | | NAME OF VARIABLE | MEANING | TYPE (REFERENCE) |
|---|---|---|---|---|
| 16bits | | NUM_OF_PL (*N1) | NUMBER OF REGISTERED PLAYLIST FILES | |
| ×N1 | 16bits | PL_NO | PLAYLIST FILE NUMBER | A-7 |
| | 24bits | FILE_SIZE_OF_PL | FILE SIZE OF PLAYLIST FILE [BYTES] | A-1 |
| | 16bits | PI_CNT_OF_PL | PLAYITEM COUNT IN PLAYLIST FILE | A-2 |
| | 16bits | EM_CNT_OF_PL | ENTRY MARK COUNT IN PLAYLIST FILE | A-3,B-3 |
| | 16bits | PLM_CNT_OF_PL | PLAYLIST MARK COUNT IN PLAYLIST FILE | A-3,B-3 |
| | 32bits | DURATION_OF_PL | TOTAL PLAY TIME OF PLAYLIST FILE [90 kHz] | B-1 |
| | 8bits | IS_SELF_REC_PL | PLAYLIST FILE RECORDED BY OWN APPARATUS OR OTHER APPARATUS (00: OWN APPARATUS/01: OTHER APPARATUS) | A-6,B-2 |
| | 32bits | LSN_OF_PL | LSN RECORDING PLAYLIST FILE (UNKNOWN:FFFFFFFFh) | |
| 16bits | | NUM_OF_CI (*N2) | NUMBER OF REGISTERED CLIPINFO FILE | |
| ×N2 | 24bits | CI_NO | CLIPINFO FILE NUMBER (=CLIP AV STREAM FILE NUMBER) | A-8,B-9 |
| | 16bits | EP_F_CNT_OF_CI | EP_fine COUNT IN CLIPINFO FILE | A-4 |
| | 24bits | EP_C_CNT_OF_CI | EP_coarse COUNT IN CLIPINFO FILES | A-4 |
| | 8bits | VIDEO_CODING_TYPE | CODING TYPE OF VIDEO IN CLIPINFO FILE (1Bh:AVC) | A-5 |
| | 8bits | VIDEO_FORMAT | VERTICAL RESOLUTION AND SCANNING TYPE OF VIDEO IN CLIPINFO FILE | A-5 |
| | 8bits | VIDEO_FRAME_RATE | FRAME RATE OF VIDEO IN CLIPINFO FILE | A-5 |
| | 8bits | VIDEO_ASPECT_RATIO | ASPECT RATIO OF CLIPINFO FILE | A-5 |
| | 8bits | VIDEO_HORIZONTAL_SIZE | HORIZONTAL RESOLUTION OF VIDEO IN CLIPINFO FILE | A-5 |
| | 32bits | LSN_OF_CI | LSN RECORDING IN CLIPINFO FILE (UNKNOWN:FFFFFFFFh) | |
| 16bits | | NUM_OF_DUMMY_PL (*N3) | NUMBERED OF INVALID REGISTERED PLAYLIST NUMBERS | |
| ×N3 | 16bits | DUMMY_PL_NO | INVALID PLAYLIST FILE NUMBER | A-7 |
| 16bits | | NUM_OF_DUMMY_CI (*N4) | NUMBER OF INVALID CLIPINFO FILE NUMBERS | |
| ×N4 | 24bits | DUMMY_CI_NO | INVALID CLIPINFO FILE NUMBER | A-8 |
| 16bits | | NUM_OF_DUMMY_TS (*N5) | NUMBER OF INVALID CLIP AV STREAM FILE NUMBERS | |
| ×N5 | 24bits | DUMMY_TS_NO | INVALID CLIP AV STREAM FILE NUMBER | A-9 |

INFORMATION PROCESSING DEVICE, INFORMATION PROCESSING METHOD, AND COMPUTER PROGRAM

TECHNICAL FIELD

The present invention relates to an information processing apparatus, an information processing method and a computer program, each for performing a data recording process and a data playing process. More specifically, the present invention relates to an information processing apparatus, an information processing method and a computer program, each for recording data and playing data in accordance with a recording format having a layered data management structure.

BACKGROUND ART

As the recording capacity of disk-type recording media increases, video cameras storing moving images or still images on a disk instead of the known recording tape are commercially available. Since the disk-type recording medium is used in a random-access fashion, any desired scene can be efficiently found from recorded data. Since the disk-type recording medium operates in a non-contact fashion, data accessing to the disk is performed in a manner free from physical wear. For example, DVD video cameras are in widespread use because of ease of use, high image quality and editing features.

Apparatuses recording and playing high-vision data of high data quality, namely, HD (High-Definition) digital data have been developed and used.

An AVCDH format has been proposed as a latest HD data recording format. The AVCHD format is a format to be used to encode a moving image stream picked up by a video camera into an MPEG2-TS stream and record the encoded moving image stream. The AVCHD format has a layered data management structure.

In accordance with the AVCHD format, each of an index file (index), a movie object file (MovieObject), a play list file (PlayList), a clip information file (ClipInformation) and a clip AV stream file (ClipAVStream) is generated and recorded. The recording format is described in detail in the discussion of the present invention.

In the AVCHD format, actual data is recorded in the clip AV stream file (ClipAVStream) and management information corresponding to the actual data is recorded among attribute information files including the index file (index), the movie object file (MovieObject), the play list file (PlayList) and the clip information file (ClipInformation).

When one of the data editing process and the data playing process is performed on the recorded data subsequent to data recording, information required to start the editing process, the playing process, and the write-once recording process is read from each of these files. With required information is distributed among a plurality of files, accessing and reading the plurality of files need to be performed. It takes time to collect required information.

DISCLOSURE OF INVENTION

Problems to be Solved by the Invention

The present invention has been developed in order to overcome the above-described problem and it is an object of the present invention to provide an information processing apparatus, an information processing method and a compute program, each for performing efficiently an editing process, a playing process and a write-once recording process on record data in a data recording format having a layered data management structure in a manner free from the necessity for accessing to a number of files.

Means for Solving the Problems

The present invention in a first aspect relates to an information processing apparatus. The information processing apparatus includes a controller for performing data recording process control on an information recording medium. The controller designed to perform data recording control in accordance with a data recording format having a predetermined layered management structure, storing identification information in an index file of index information of record data and recording the index file with the identification information stored therewithin onto the information recording medium, the identification information being required to perform at least one of a playing process on the record data, an editing process one the record data and a write-once recording process on data on the information recording medium.

In the information processing apparatus of one embodiment of the present invention, the controller performs an update process of the identification information in response to updating of data recorded on the information recording medium.

In the information processing apparatus of one embodiment of the present invention, the controller performs the update process of the identification information subsequent to one of the editing process on the date recorded on the information recording medium and the write-once recording process on data to the information recording medium.

In the information processing apparatus of one embodiment of the present invention, the identification information is information selected from information recorded in an attribute information file including attribute information defined in the data recording format having the layered management structure.

In the information processing apparatus of one embodiment of the present invention, the identification information is information recorded in one of a playlist file and a clip information file, each defined in the data recording format having the layered management structure, and includes information required to perform one of the editing process on the record data and the write-once recording process on the data to the information recording medium, the information including information of (A1)-(A9) of (A1) a file size of each of a playlist and clip information,
(A2) the numbers of playitems and sub paths of the playlist,
(A3) the numbers of entry marks and playlist marks of the playlist,
(A4) the number of entry points (EPs) of the clip information,
(A5) a video attribute of the clip information,
(A6) determination results as to whether the playlist is on own apparatus or another apparatus,
(A7) a file number of the playlist recorded on the information recording medium,
(A8) a file number of the clip information recorded on the information recording medium, and
(A9) a file number of a clip AV stream recorded on the information recording medium.

In the information processing apparatus of one embodiment of the present invention, the identification information is information recorded in one of a playlist file and a clip information file, each defined in the data recording format having the layered management structure, and includes information required to perform the playing process on the record data, the information including information of (B1)-(B3) of (B1) a total play time of the playlist, (B2) determination results as to whether the playlist is on own apparatus or another apparatus, and (B3) the numbers of entry marks and playlist marks of the playlist.

In the information processing apparatus of one embodiment of the present invention, in the write-once recording process on the data to the information recording medium, the controller references the identification information retrieved from the index file and stored on a memory of the information processing apparatus and then performs at least one of a determination process of whether to perform the write-once recording process and a determination process of determining a mode of the write-once recording process.

In the information processing apparatus of one embodiment of the present invention, in the editing process of the data recorded on the information recording medium, the controller references the identification information retrieved from the index file and stored on a memory of the information processing apparatus and then performs at least one of a determination process of whether to perform the editing process and a determination process of determining a mode of the editing process.

In the information processing apparatus of one embodiment of the present invention, in the playing process of the data recorded on the information recording medium, the controller references the identification information retrieved from the index file and stored on a memory of the information processing apparatus and then performs a process of retrieving information to be applied to the playing mode.

In the information processing apparatus of one embodiment of the present invention, the data recording format having the layered management structure is the AVCHD format.

The present invention in a second aspect relates to an information processing apparatus. The information processing apparatus includes a controller for controlling one of a playing process and an editing process on data recorded on an information recording medium. The controller designed to perform one of the playing process and the editing process on the data by reading from the information recording medium the data recorded in accordance with a data recording format having a predetermined layered management structure, reads, from an index file of index information of record data, information required to perform at least one of the playing process on the record data and the editing process on the record data, stores the read information onto a memory, and performs one of the data playing process and the data editing process by referencing the information stored on the memory.

In the information processing apparatus of one embodiment of the present invention, the data recording format having the layered management structure is an AVCHD format.

The present invention in a third aspect relates to an information processing method of an information processing apparatus, and a controller of the information processing apparatus designed to perform data recording control in accordance with a data recording format having a predetermined layered management structure, stores identification information in an index file of index information of record data and records the index file with the identification information stored therewithin onto the information recording medium, the identification information being required to perform one of a playing process on the record data, an editing process one the record data and a write-once recording process on data on the information recording medium.

In the information processing method of one embodiment of the present invention, the controller performs an update process of the identification information in response to updating of data recorded on the information recording medium.

In the information processing method of one embodiment of the present invention, the controller performs the update process of the identification information subsequent to one of the editing process on the date recorded on the information recording medium and the write-once recording process on data to the information recording medium.

In the information processing method of one embodiment of the present invention, the identification information is information selected from information recorded in an attribute information file containing attribute information defined in the data recording format having the layered management structure.

In the information processing method of one embodiment of the present invention, the identification information is information recorded in one of a playlist file and a clip information file, each defined in the data recording format having the layered management structure, and includes information required to perform one of the editing process on the record data and the write-once recording process on the data to the information recording medium, the information including information (A1)-(A9) of (A1) a file size of each of a playlist and clip information, (A2) the numbers of playitems and sub paths of the playlist, (A3) the numbers of entry marks and playlist marks of the playlist, (A4) the number of entry points (EPs) of the clip information, (A5) a video attribute of the clip information, (A6) determination results as to whether the playlist is on own apparatus or another apparatus, (A7) a file number of the playlist recorded on the information recording medium, (A8) a file number of the clip information recorded on the information recording medium, and (A9) a file number of a clip AV stream recorded on the information recording medium.

In the information processing method of one embodiment of the present invention, the identification information is information recorded in one of a playlist file and a clip information file, each defined in the data recording format having the layered management structure, and includes information required to perform the playing process on the record data, the information including information (B1)-(B3) of (B1) a total play time of the playlist, (B2) determination results as to whether the playlist is on own apparatus or another apparatus, and (B3) the numbers of entry marks and playlist marks of the playlist.

In the information processing method of one embodiment of the present invention, in the write-once recording process on the data to the information recording medium, the controller references the identification information retrieved from the index file and stored on a memory of the information processing apparatus and then performs at least one of a determination process of whether to perform the write-once recording process and a determination process of determining a mode of the write-once recording process.

In the information processing method of one embodiment of the present invention, in the editing process of the data recorded on the information recording medium, the controller references the identification information retrieved from the index file and stored on a memory of the information processing apparatus and then performs at least one of a determination process of whether to perform the editing process and a determination process of determining a mode of the editing process.

In the information processing method of one embodiment of the present invention, in the playing process of the data recorded on the information recording medium, the controller references the identification information retrieved from the index file and stored on a memory of the information processing apparatus and then performs a process of retrieving information to be applied to the playing mode.

In the information processing method of one embodiment of the present invention, the data recording format having the layered management structure is an AVCHD format.

The present invention in a fourth aspect relates to an information processing method of an information processing apparatus. A controller of the information processing apparatus designed to perform one of a playing process and an editing process on data by reading from an information recording medium the data recorded thereon in accordance with a data recording format having a predetermined layered management structure, reads, from an index file of index information of record data, information required to perform at least one of the playing process on the record data and the editing process on the record data, stores the read information onto a memory, and performs one of the playing process and the editing process by referencing the information stored on the memory.

In the information processing apparatus of one embodiment of the present invention, the data recording format having the layered management structure is an AVCHD format.

The present invention in a fifth aspect relates to a computer program for causing an information processing apparatus to process information. A controller of the information processing apparatus designed to perform data recording control in accordance with a data recording format having a predetermined layered management structure, stores identification information in an index file of index information of record data and records the index file with the identification information stored therewithin onto the information recording medium, the identification information being required to perform at least one of a playing process on the record data, an editing process on the record data and a write-once recording process on data to the information recording medium.

The present invention in a sixth aspect relates to a computer program for causing an information processing apparatus to process information. A controller of the information processing apparatus designed to perform one of a playing process and an editing process on data by reading from the information recording medium the data recorded in accordance with a data recording format having a predetermined layered management structure, reads, from an index file of index information of record data, information required to perform at least one of the playing process on the record data and the editing process on the record data, stores the read information onto a memory, and performs one of the data playing process and the data editing process by referencing the information stored on the memory.

The computer program of the present invention is supplied to a computer system in a computer readable fashion in one of a recording medium and a communication medium. For example, the recording media include CD, FD, or MO and the communication media include a network. By supplying the computer program in a computer readable fashion, the computer system performs processes responsive to the program.

These and other features and advantages of the present invention will become apparent from the following detailed description of the embodiments of the present invention and the accompanying drawings. In this specification, the term system refers to a logical set of a plurality of apparatuses and elements of each apparatus are not necessarily housed in a single casing.

Advantages

In accordance with one embodiment of the present invention, when data is recorded in a data recording format having a layered management structure such as an AVCHD format, the identification information required to perform one of the record data playing process, the record data editing process, and the write-once recording process on the data to the information recording medium is stored in the index file having index information of the record data. This arrangement eliminates the need for retrieval of information from a variety of files when one of the playing process, the editing process and the write-once recording process is performed. One of the playing process, the editing process and the write-once recording process is thus quickly performed.

BRIEF DESCRIPTION OF THE DRAWINGS

FIG. 9 illustrates syntax of an index file.

FIG. 10 illustrates syntax of an extension information block of the index file.

FIG. 11 illustrates a structure of a data block of the extension information block of the index file.

FIG. 12 illustrates data within a maker private data block of the extension information block of the index file.

FIG. 13 illustrates a structure of the maker private data of the index file and specific information to be recorded on a data block in the maker private data.

FIG. 14 illustrates specific information to be recorded on the maker private data of the index file.

BEST MODE FOR CARRYING OUT THE INVENTION

An information processing apparatus, an information processing method and a computer program, of the present invention, are described in detail below with reference to the drawings. The present invention is described section by section in the following listing order.

1. System configuration
2. Data format
3. Management information recording structure of an index file
4. Data processing sequence

[1. System Configuration]

Figure 1:
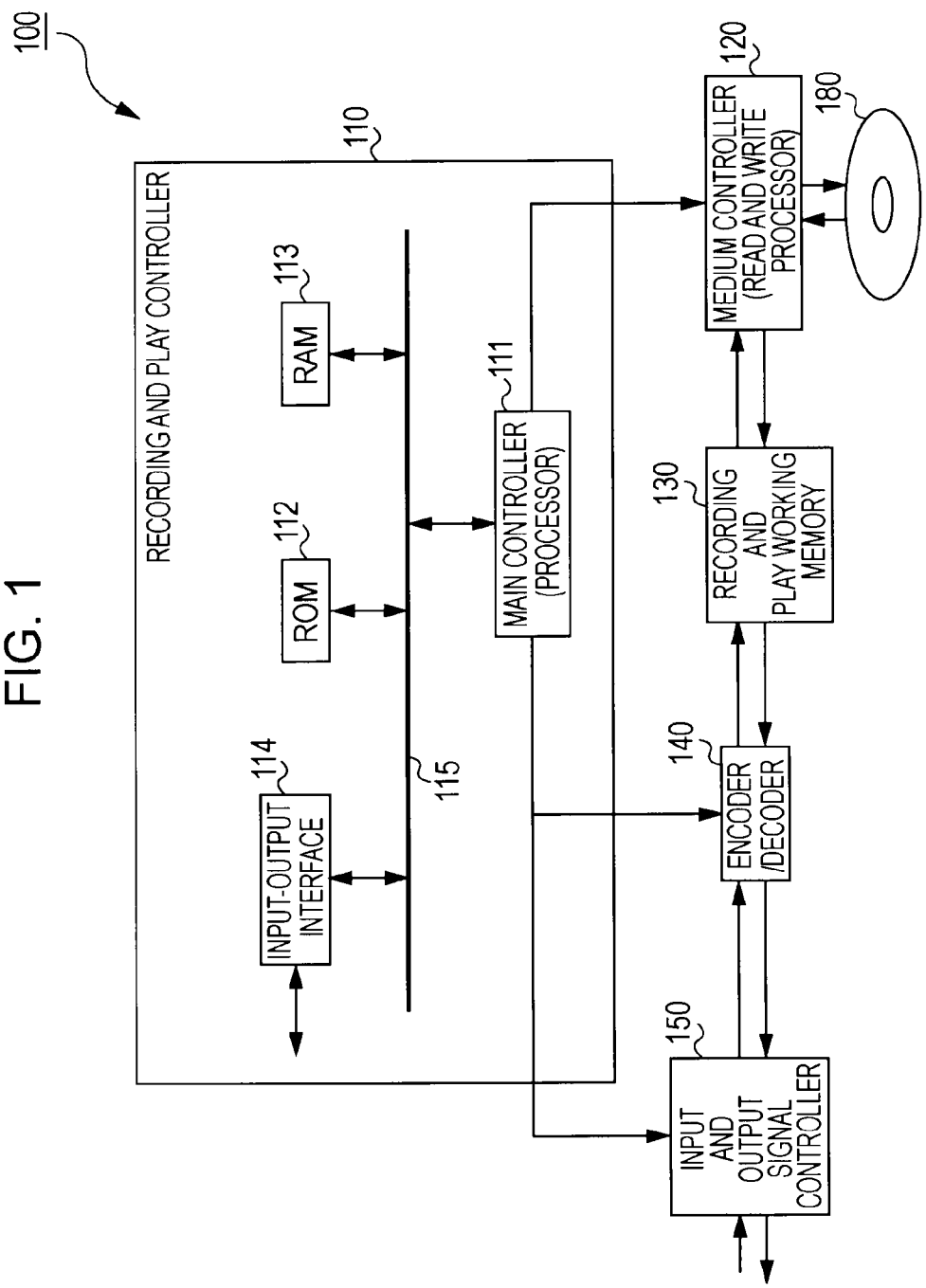
FIG. 1 is a block diagram illustrating an information processing apparatus of the present invention.

FIG. 1 is a block diagram illustrating an information processing apparatus 100 in accordance with one embodiment of the present invention. FIG. 1 shows a video camera as one example of the information processing apparatus. As shown in FIG. 1, the information processing apparatus 100 includes a recording and play controller 110, a medium controller (reading and writing processor) 120, a recording and play working memory 130, an encoder and decoder 140 and an input and output signal controller 150. The recording and play controller 110 includes a main controller (processor) 111, a ROM 112, a RAM 113, and an input-output interface 114.

The information processing apparatus 100 is designed to record and play a moving image and a still image using an information recording medium 180. The data recording on the information recording medium 180 may be performed in accordance with the AVCHD format. The data recording in accordance with the AVCHD format will be described in detail in section [2. Data format].

When data is recorded, the encoder and decoder 140 encodes the moving image or the still image input from the input and output signal controller 150. For example, the encoder and decoder 140 performs the encoding process on a video stream and an audio stream, composed of an input moving image signal, into a multiplexed data stream. The data encoded by the encoder and decoder 140 is stored on the recording and play working memory 130 and then recorded onto the information recording medium 180 under the control of the medium controller 120.

The encoding operation performed by the encoder and decoder 140 during the data recording process becomes different between the moving image and the still image. The information recording medium 180 thus records thereon a moving image file and a still image file.

The recording and play controller 110 performs a variety of processes including a data recording process and a data playing process. The recording and play controller 110 includes the main controller 111, the ROM 112, the RAM 113, the input-output interface 114 and a bus 115 used to interconnect these elements.

The main controller 111 issues to the encoder and decoder 140 a start command and a stop command to start and stop the encoding process, respectively. The main controller 111 also issues to the medium controller 120 a data read command and a data write command to read data from and write data to the medium controller 120, respectively. The main controller 111 controls the input and output signal controller 150 to perform a capturing operation of capturing an input signal from the encoder and decoder 140 and an output operation to output a captured input signal to the encoder and decoder 140.

The ROM 112 in the recording and play controller 110 stores a program executed by the main controller 111 and a variety of parameters. The ROM 112 may include an EEPROM such as a flash memory. The RAM 113 stores work data required for the main controller 111 to execute the program, and may include one of an SRAM and a DRAM. The input-output interface 114 is connected to a user input unit, a display, or a network and exchanges data and commands with an external device. The input-output interface 114 is used to update the program stored on the ROM 112, for example.

[2. Data Format]

Figure 2:
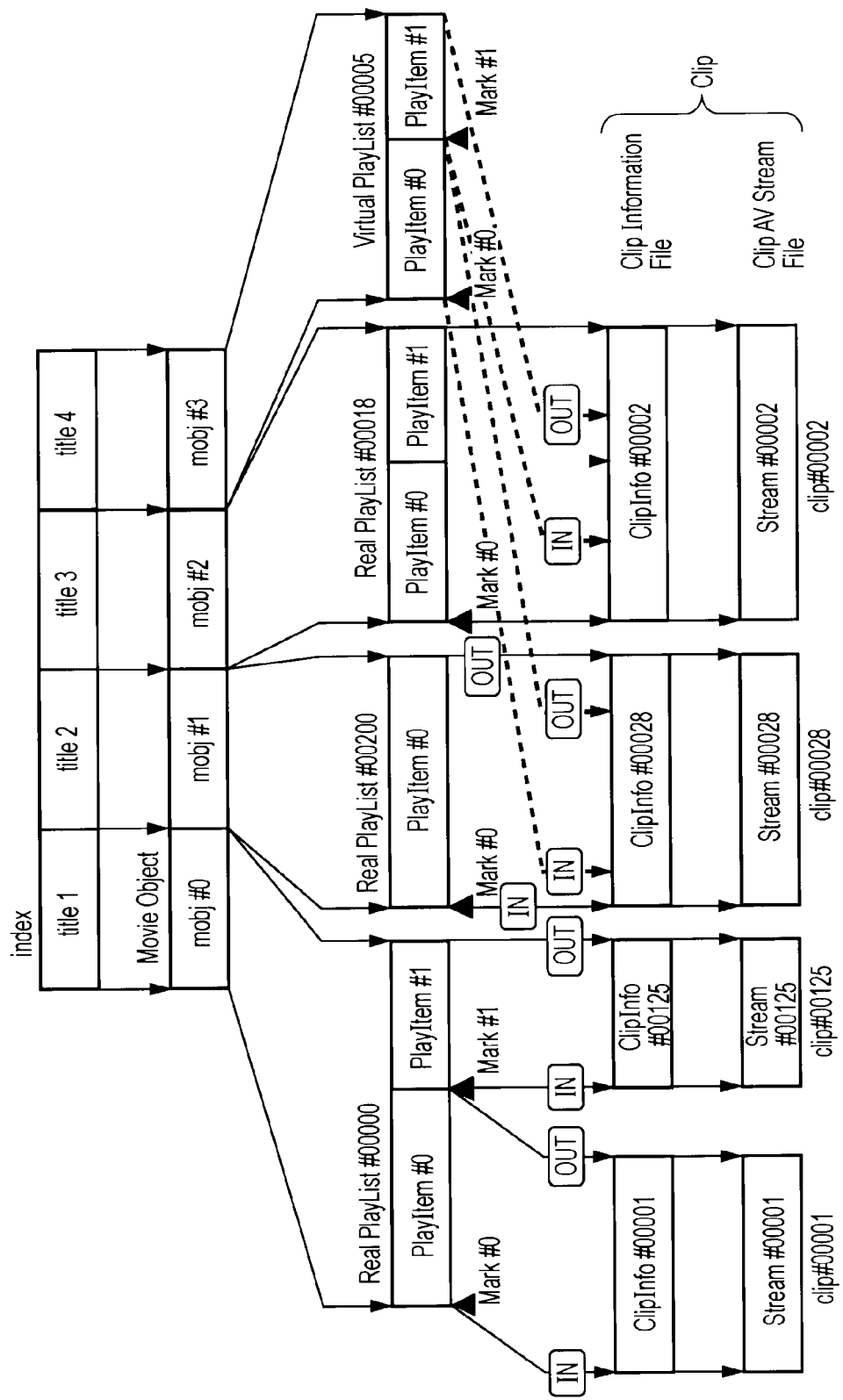
FIG. 2 illustrates a data structure of record data on an information recording medium.

FIG. 2 illustrates an example of a data structure of data to be recorded on the information recording medium 180. In the following discussion, data recording in accordance with the AVCHD format is described. As shown, when the moving image stream captured by the video camera is encoded into an MPEG2-TS format stream, an index file, a movie object (MovieObject) file, a play list file (PlayList), a clip information file (ClipInformation), and a clip AV file stream (ClipAVStream) are recorded. A clip AV stream file having a predetermined data unit and a clip information file corresponding thereto are collectively referred to as a clip. The index file, the movie object file (MovieObject), the play list file (PlayList), the clip information file (ClipInformation), and the clip AV stream file (ClipAVStream), each containing management information other than the clip AV stream file containing photographed moving image data, are attribute information files. Each file is described in detail.

TABLE 1

| File type | Maximum number | Function |
| --- | --- | --- |
| Index | 1 | Base file managing the entire medium, namely, managing correspondence between title to be shown to user and MovieObject. In AVCHD format, play order of playlist to be managed in MovieObject file is managed within metadata of index file. |
| MovieObject | 1 | In BD-ROM format, MovieObject file manages playlist played when title is specified. In AVCHD format, however, MovieObject is not referenced, and relation between playlist and title is managed by metadata in index file. |
| Real PlayList | 2000 in total | Playlist of original title. Registered in the order of recording of recorded video or played video. |
| Virtual Playlist | | Playlist for producing user-defined playlist in non-destructive editing. Having no clip for the virtual playlist itself but specifying clip registered in real playlist for playing. |
| Clip Information | 4000 | Paired with Clip AV Stream and containing information related to stream required to play actual stream. |
| Clip AV Stream | 4000 | Stored in stream recorded in MPEG2-TS. AVC image data stored in this file. |

The whole information recording medium 180 is managed in a file type layer of index. An index file is produced for each title to be displayed to a user. The index file manages a correspondence relationship with a MovieObject file. In the AVCHD format, the play order to be managed by the MovieObject file is actually managed in metadata of the index file. When an information recording medium is loaded on a player, the index file is first read and the user can see the title described in the index file.

The MovieObject file manages a playlist to be played. A reference to the MovieObject file is listed in the index file as an entrance to the title. In the AVCHD format, however, the relationship between the PlayList and the title is managed by the metadata in the index file without referencing the MovieObject file.

The PlayList is arranged for each title to be displayed to the user, and contains at least one PlayItem. Each PlayItem contains a play start point (IN point) and a play end point (OUT point) for each clip, thereby specifying a play period. By arranging a plurality of PlayItems within the PlayList along time axis, the play order in the play period may be specified. PlayItems referencing different clips may be contained in a single PlayList.

The reference relationship between the clip and the PlayList may be optionally set. For example, a single clip may be referenced by two PlayLists different in IN point and OUT point. The reference relationship between the title and MovieObject may be optionally set. PlayLists are divided into real play lists (RealPlayLists) and virtual play lists (VirtualPlayLists) depending on the reference relationship thereof with clips.

The RealPlayList is a PlayList for an original title and is recorded in the record order of PlayItems of a video stream recorded or photographed by the video camera.

The VirtualPlayList is used to produce a user-defined PlayList through non-destructive editing. The VirtualPlayList has no clip (AV stream) thereof, and a PlayItem therewithin indicates a clip or a portion of the clip registered in a RealPlayList. More specifically, the user extracts a needed play period from a plurality of clips and collects PlayItems pointing to the play period, thereby editing the VirtualPlayList.

The ClipAVStream file contains a stream recorded in the MPEG-TS format on the information recording medium 180. Image data is stored in this file.

The ClipInformation file, paired with the ClipAVStream file, contains information relating to a stream required to play an actual stream.

As described above, attribute files including the index file, the movie object file (MovieObject), the play list file (PlayList), and the clip information (ClipInformation) and the AV stream file (ClipAVStream) containing moving image data are generated and recorded in a layered structure in accordance with the AVCHD format as illustrated in FIG. 2.

The names of these files and data are examples only, and different names can be used. The content of each file and data are listed as below.

(1) AV stream (ClipAVStream): Content data (2) Clip information (ClipInformation): The clip information has one-to-one correspondence with the AV stream and the ClipInformation file defines attribute of the corresponding AV stream. (For example, coding, size, time to address conversion, play management information, time map, etc. are contained in this file.)

(3) Play item (PlayItem): Data specifying a play period by a play start point and a play end point to the clip information (ClipInformation).

(4) Play list (PlayList): Each play list is composed at least one play item (PlayItem).

(5) Mark: Mark is typically present in the play list (PlayList) and indicates time position in the play content. Generally, a duration from one mark to a next mark is referred to as a chapter.

(6) Movie object (MovieObject): Set of commands for controlling playing.

(7) Title: Set of play lists (recognizable by the user).

Data and files having the above contents are described as the AV stream (ClipAVStream), the clip information (ClipInformation), the play item (PlayItem), the play list (PlayList), the mark, the movie object (MovieObject), and the title. The present invention is also applicable to data and files having contents substantially identical in structure to those described above.

Figure 3:
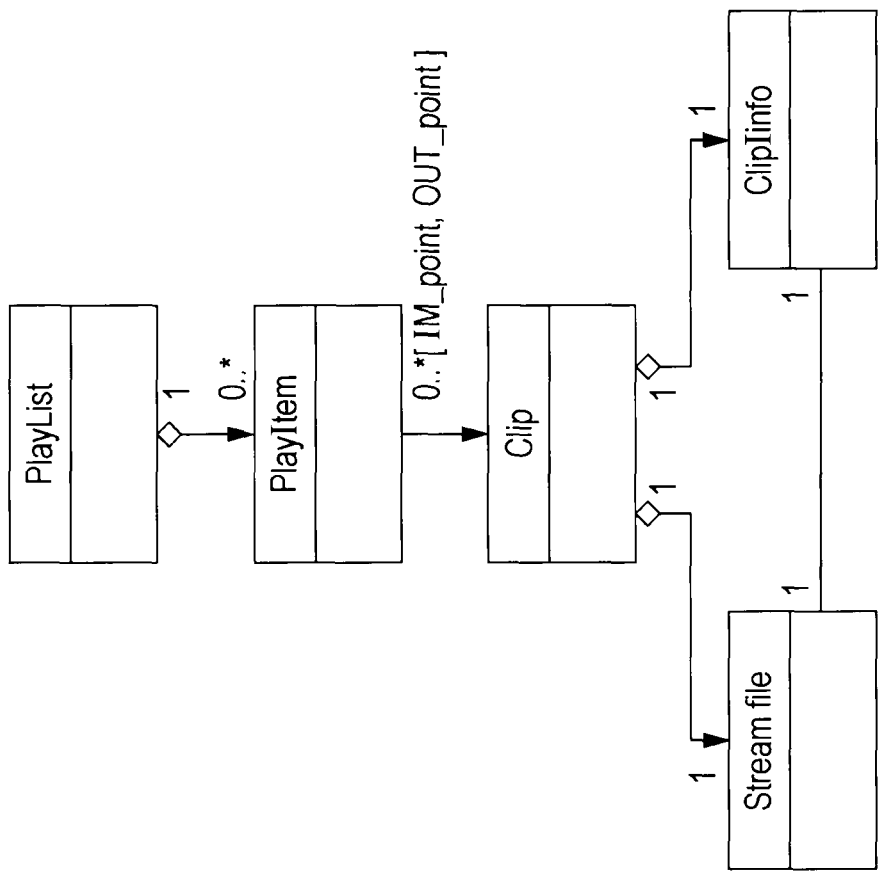
FIG. 3 illustrates UML (Unified Modeling Language) indicating a relationship of a play list (PlayList), a play item (PlayItem), clip information (ClipInformation) and a clip AV stream (ClipAVStream).

FIG. 3 illustrates UML (Unified Modeling Language) indicating the relationship of the play list (PlayList), the play item (PlayItem), the clip, the clip information (ClipInformation), the clip AV stream (ClipAVStream) described with reference to FIG. 2. The play list is mapped to one or a plurality of play items, and each play item is mapped to one clip. One clip can map to a plurality of play items different in start point and/or end point. One clip AV stream file can be referenced from one clip. Similarly, one clip information file can be referenced from one clip. The clip AV stream file and the clip information file have one-to-one correspondence to each other. By defining this structure, play order is specified in a non-destructive fashion with any portion extracted without modifying the clip AV stream file.

Figure 4:
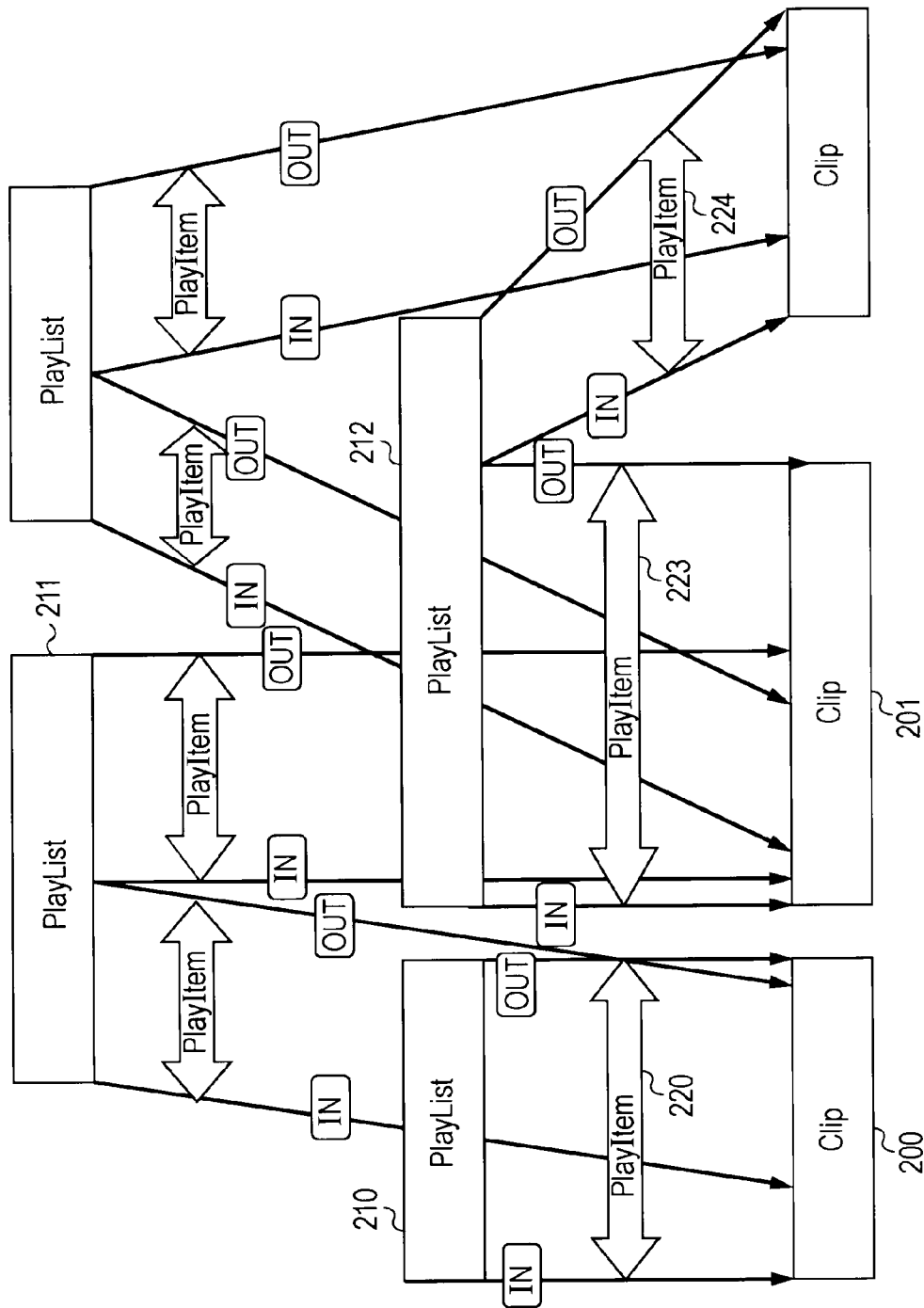
FIG. 4 illustrates a reference relationship of clips in the play list.

With reference to FIG. 4, the same clip may be referenced from a plurality of play lists. Alternatively, a plurality of clips may be referenced from a single play list. The clip may be referenced by the IN point and the OUT point indicated in the play item in the play list. As shown in FIG. 4, a clip 200 can be referenced from a play item 220 in a play list 210 while also being referenced from a play item 221 out of play items 221 and 222 in a play item 211 in accordance with a play period defined by an IN point and an OUT point. A clip 201 is referenced by a play item 222 in the play list 211 in accordance with a play period defined by an IN point and an OUT point. The clip 201 is also referenced in accordance with a period defined by an IN point and an OUT point of the play item 223 out of play items 223 and 224 in a play list 212.

Figure 5:
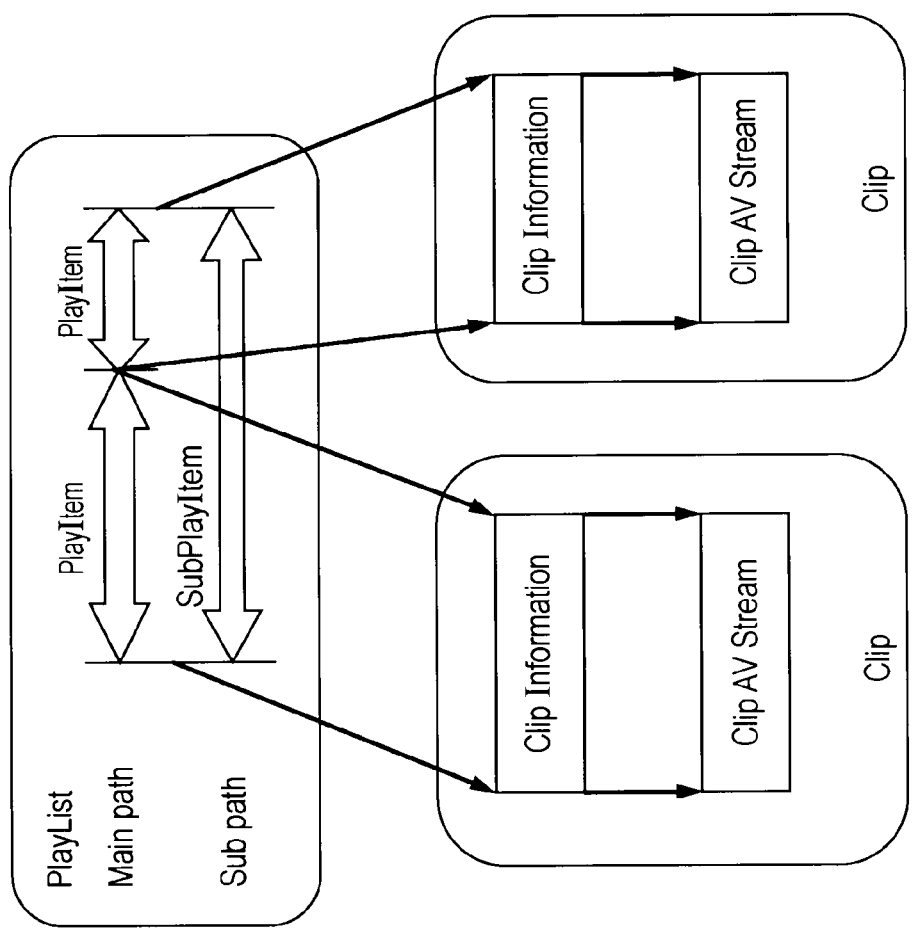
FIG. 5 illustrates a relationship of a main path set in the play list, a play list of a sub path and a clip.

As shown in FIG. 5, the play list can have a sub path corresponding to a sub play item as opposed to a main path corresponding to a play item mainly being played. For example, an after-recording play item attached to a play list may be handled as a sub play item. The play list can have a sub play item only when certain conditions are satisfied, although no further detailed discussion about this is provided herein.

Figure 6:
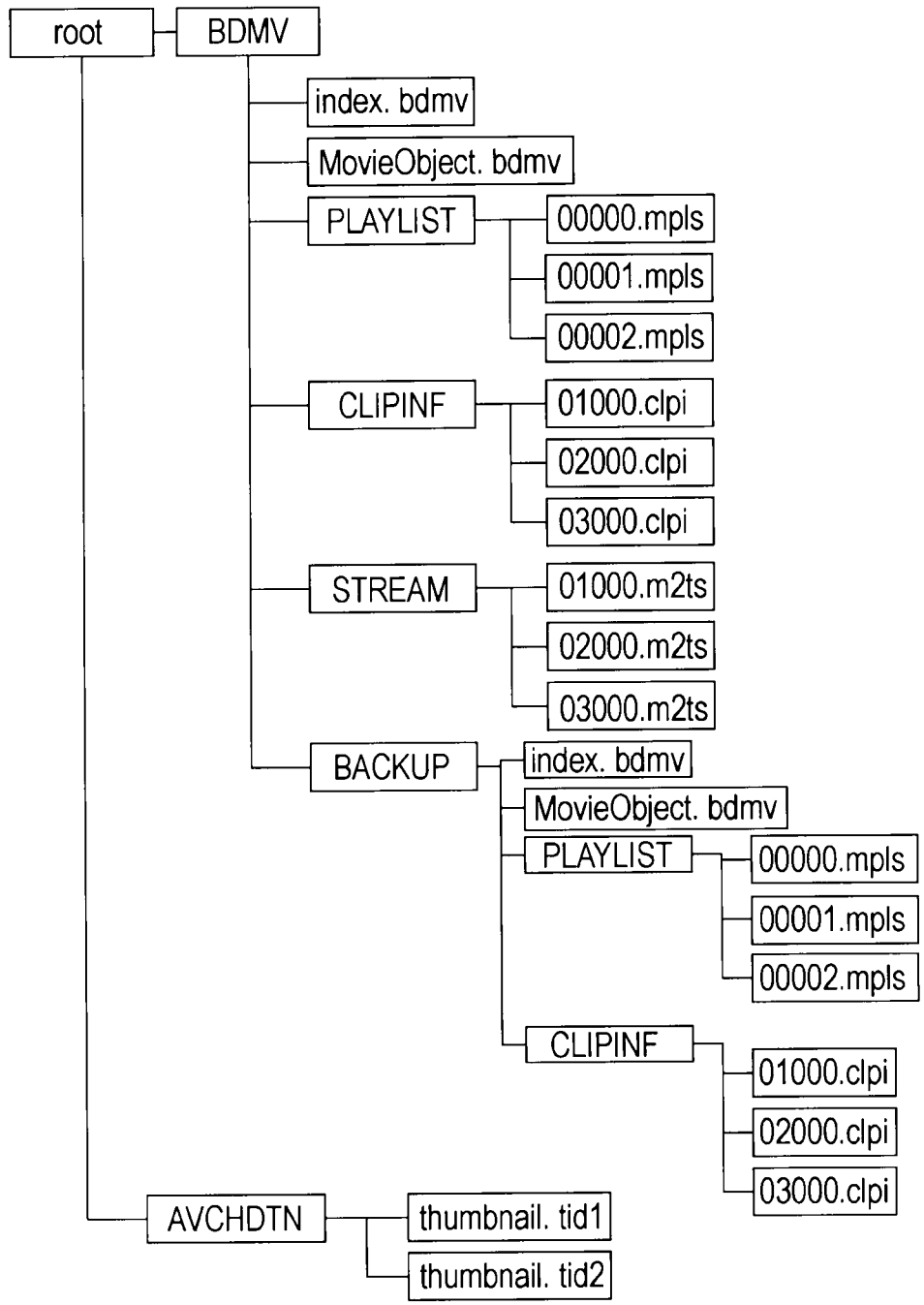
FIG. 6 illustrates a management structure of a file recorded on the information recording medium.

A management structure of a file to be recorded on the information recording medium 180 is described below with reference to FIG. 6. As described above with reference to FIGS. 2 through 4, the data to be recorded on the information recording medium 180 includes the movie object (MovieObject), the play list (PlayList), and the clip. The clip includes the clip information file (CipInformation) and the clip AV stream file (clipAVStream). The files are managed by layer. One directory (a root directory in FIG. 6) is created on the information recording medium 180. The directories under the root directory are a range controlled by a single recording and reproducing system.

Arranged under the root directory are a directory [BDMV] and a directory [AVCHDTN]. A thumbnail file having a representative image of a clip contracted to a predetermined size is arranged under the directory [AVCHDTN]. The data structure discussed with reference to FIG. 2 is stored under the directory [BDMV].

Only two files, namely, an index file [index.bdmv] and a movie object file [MovieObject.bdmv], can be arranged under the directory [BDMV]. The directories arranged under the directory [BDMV] are a play list directory [PLAYLIST], a clip information directory [CLIPINF], a directory [STREAM], and a directory [BACKUP].

The content of the directory [BDMV] is described in the index file [index.bdmv]. The movie object file [MovieObject.bdmv] stores information regarding at least one movie object.

The play list directory [PLAYLIST] contains a database of the PlayList. More specifically, the play list directory [PLAYLIST] contains a play list file [xxxxx.mpls] as a file relating to a movie play list. The play list file [xxxxx.mpls] is created for each of the movie play lists. In the file name, [xxxxx] preceding [.] (period) is a five digit number, and [mpls] following the period is an extension fixed to this type of file.

The clip information directory [CLIPINF] contains a database of each clip. More specifically, the clip information directory [CLIPINF] contains a clip information file [zzzzz.clpi] corresponding to each clipAVStream file. In the file name, [zzzzz] preceding [.] (period) is a five digit number, and [clpi] following the period is an extension fixed to this type of file.

The stream directory [STREAM] contains an AV stream file as a body. More specifically, the stream directory [STREAM] contains a clip AV stream file corresponding to each clip information file. The clip AV stream file contains a MPEG 2 (Moving Picture Experts Group 2) transport stream (hereinafter referred to as MPEG2 TS), and has a file name [zzzzz.m2ts]. In the file name, [zzzzz] preceding the period is identical to that of the corresponding clip information file to allow the correspondence between the clip information file and the clip AV stream file to be easily recognized.

The directory [AVCHDTN] can contain two types of thumbnail files, namely, a thumbnail.tid1 file and a thumbnail.tid2 file. The thumbnail.tid1 file contains a thumbnail image encoded in accordance with a predetermined method. The thumbnail.tid2 file contains an unencoded thumbnail image. For example, a thumbnail image corresponding to a clip the user has photographed with a video camera is copy free and needs no encoding, and is thus contained in the thumbnail.tid2 file.

Figure 7:
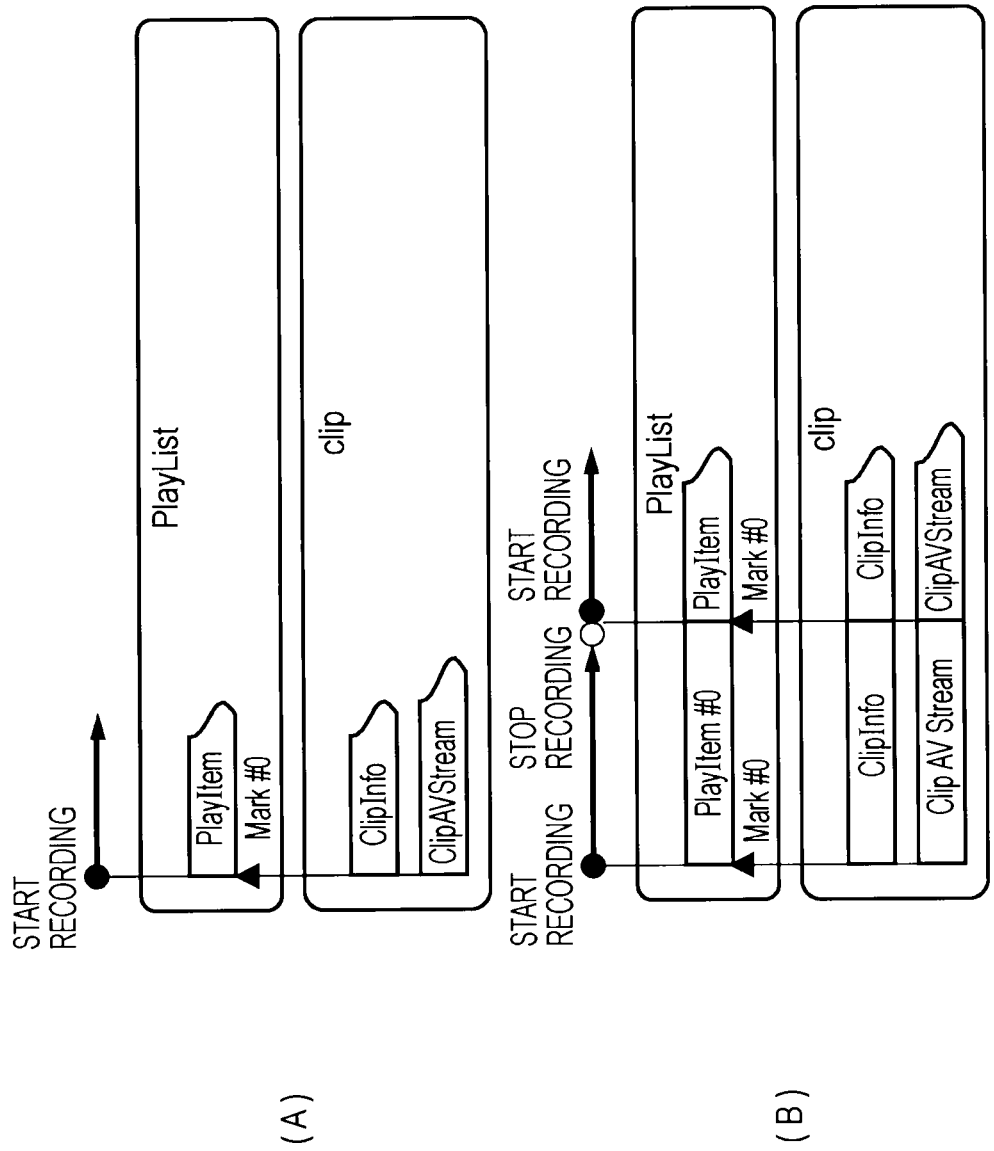
FIG. 7 illustrates a generation process of a play list that is generated together with a clip of an AV stream when a video camera picks up and records image.
Figure 8:
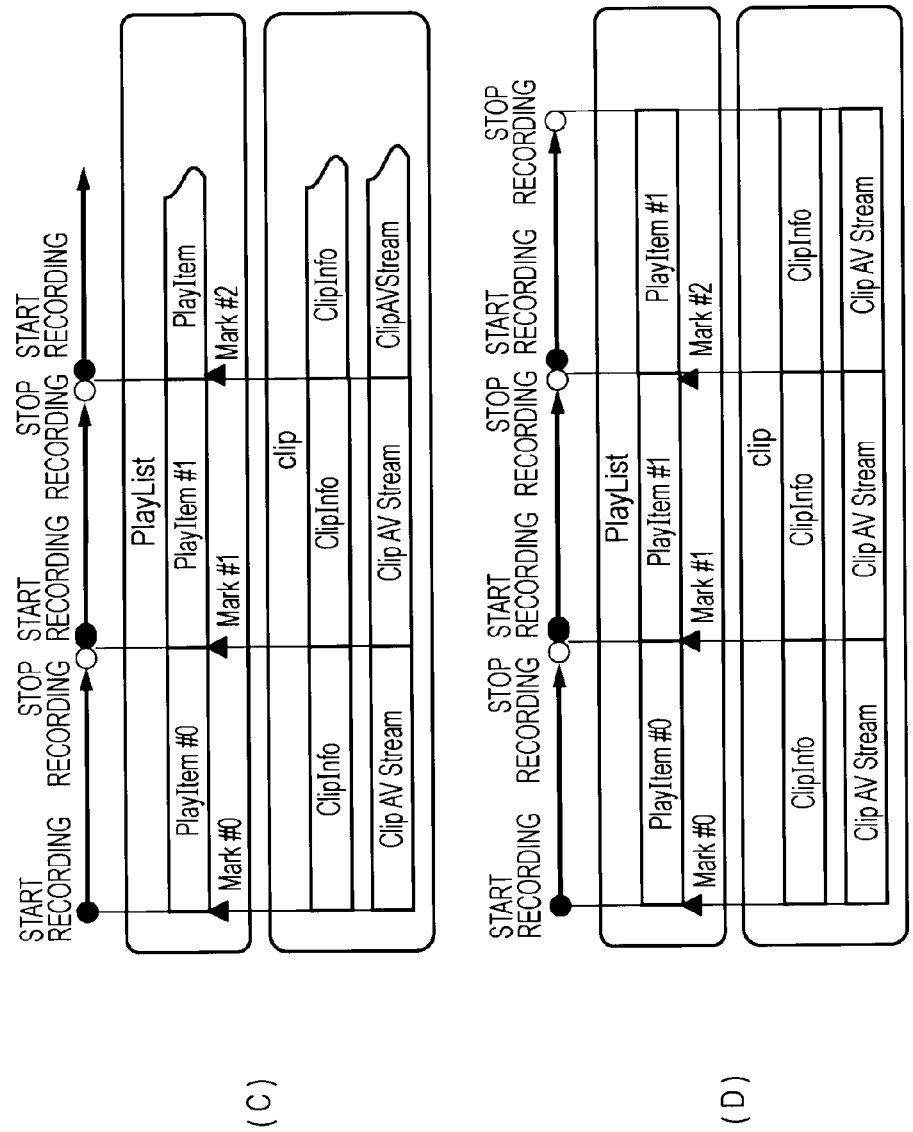
FIG. 8 illustrates a generation process of a play list that is generated together with a clip of an AV stream when a video camera picks up and records image.

A generation process of generating the PlayList together with the AV stream in step with the photographing and recording of the video by the video camera is described below with reference to FIGS. 7 and 8.

FIGS. 7(a) and 7(b) and FIGS. 8(a) and 8(b) illustrate the generation process of the clip and the play list performed when the user starts and stops a recording process in the order of (a) through (d). As shown in FIGS. 7 and 8, one PlayItem is generated in a period from when the user starts the recording process to when the user stops the recording process. One clip AV stream file is generated in accordance with one session of the photographing and recording operation. Along with this session, the clip information file is also generated. One clip is a unit requiring playing under which continuous synchronized playing, namely, real-time playing is guaranteed.

Each time the user starts recording, a Mark as an entry mark is attached to the head of the PlayItem. The entry mark in the PlayList is referred to as a "PlayList mark (PLM)". Within one PlayList, PlayItems and the marks are serially numbered. Although the head of each PlayList for a moving image must be tagged with the respective entry mark, a predetermined operation can shift the entry mark in time axis.

Each entry mark represents an entry position at which the user has accessed the stream. Periods, each period delimited by adjacent entry marks (and a period from last mark to the end of the final PlayItem) are "chapters" as a minimum editing unit viewed from the user. The play order of the PlayLists is defined by arranging both the PlayItems and the entry marks in the play order.

[3. Record Structure of Management Information in the Index File]

As previously described with reference to FIG. 2 through FIG. 6, the index file (index), the movie object file (MovieObject), a play list file (PlayList), a clip information file (ClipInformation) and an AV stream file (ClipAVStream) are generated and recorded in the database in accordance with the AVCHD format.

Contents as real data are recorded in the AV stream file and a variety of management information corresponding to the contents is recorded in a database file composed of the index through the clip information. When one of a data editing process and a data playing process is performed subsequent to data recording, or when a write-once recording process is performed for new data, information required to perform each of these processes needs to be read from a file within a database. If the required information is recorded among a plurality of files, it is necessary to access these plurality of files, and a process to collect the required information takes time.

With the arrangement of the present invention, the information required to perform the editing process, the playing process and the write-once recording process is recorded in the index file. For example, these pieces of information are recorded in a maker private data region of the index file.

Under a controller for performing data recording process control to the information recording medium, the information processing apparatus of the present invention performs the data recording process control in accordance with a data recording format having a predetermined layered management structure (index through clip AV stream). The information processing apparatus further includes identification information in the index file storing index information of record data and then stores the index file onto the recording medium. The identification information is required to perform at least one of a record data playing process, a record data editing process and a data write-once recording process. The information processing apparatus of the present invention then performs an update process on the recorded information as necessary.

The information required to perform one of the editing process, the playing process and the write-once recording process is specifically described. The information required to perform one of the editing process, the playing process and the write-once recording process includes the following information:

A. Information required to perform the write-once recording process and the editing process A-1. File size of the playlist and clip information A-2. Play item count and sub-path count of the play list A-3. Entry mark count and play list mark count of the play list A-4. EP count in the clip information (fine EP and coarse EP)

A-5. Video attributes of the clip information (type, frame rate, aspect ratio and image size)

A-6. Play list determination as to whether the play list is on own apparatus or another apparatus A-7. File number of the play list present on the medium A-8. File number of the clip information present on the medium A-9. File number of the clip AV stream present on the medium B. Information required to perform the playing process B-1. Total play time of the play list B-2. Play list determination as to whether the play list is on own apparatus or another apparatus (* duplicate of A-6)

B-3. Entry mark count and play list mark count in the play list (* duplicate of A-3).

In accordance with the AVCHD format, information A-1 through A-9 and B-1 through B-3 is divided and recorded on the play list file and the clip information file. More specifically, the information A-1 through A-9 and B-1 through B-3 is divided and recorded on one of the play list file and the clip information file set to a AV stream file containing an AV stream. When one of the record data editing process and the record data playing process is performed or when the write-once recording process is performed on new data, the information required to perform each of these processes need to be read from each file prior to performing the process.

If the required information is distributed among a plurality of files, accessing to these files is necessary and it takes time to perform a process for collecting the required information. In accordance with the arrangement of the present invention, these pieces of information are recorded on the maker private data region set in the index file.

The record data in the index file is read by an apparatus when a data recording medium loaded on the apparatus is started. The read record data is then stored onto a memory (RAM) on the apparatus. When one of the data editing process and the data playing process is performed or when the data write-once recording process is performed, the required information can be retrieved from the memory. Therefore, one of the write-once recording process, the editing process and the playing process can start quickly.

The maker private data set in the index file is described below with reference to FIG. 9 and subsequent figures. FIG. 9 illustrates syntax of an index file 300. Index information such as a title is stored in an index file [Index.bdmv]. As shown in FIG. 9, the index file [Index.bdmv] contains as real data an application information block [ApplInfoBDMV( )], an index information block [Indexes( )] and an extension data block [blkExtensionData( )] 301.

FIG. 10 illustrates syntax of an extension data block [blkExtensionData( )] in the index file [Index.bdmv] of FIG. 9. A variety of extension data that cannot be described in other blocks within the index information can be recorded on the extension data block. Particularly, maker unique data can be recorded in a data block 302.

FIG. 11 illustrates an example of the data block 302. The data block allows maker unique data to be recorded thereon. In the example of FIG. 11, the maker unique data is recorded in a maker private data block [Maker private data( )] 303.

FIG. 12 illustrates the maker private data block [Maker private data( )] 303 in the extension data block of the index information file of FIG. 11. Maker unique data in addition to a maker ID and a model code can be recorded on a data block 304.

In the arrangement of the present invention, a variety of information A-1 through A-9 and B-1 through B-3 required to perform one of the editing process, the playing process and the write-once recording process is recorded in a data region of the maker private data block of the index information file.

FIG. 13 illustrates an index file 300 through maker private data 303 and specific information recorded in the data block 304 in the maker private data.

As shown in FIG. 13, the information required to perform one of the editing process, the playing process and the write-once recording process, namely the information list below is recorded in a maker private data region of the index file:

A. Information required to perform the write-once recording process and the editing process A-1. File size of the playlist and clip information A-2. Play item count and sub-path count of the play list A-3. Entry mark count and play list mark count of the play list A-4. EP count in the clip information (fine EP and coarse EP)

A-5. Video attributes of the clip information (type, frame rate, aspect ratio and image size)

A-6. Play list determination as to whether the play list is on own apparatus or another apparatus A-7. File number of the play list present on the medium A-8. File number of the clip information present on the medium A-9. File number of the clip AV stream present on the medium B. Information required to perform the playing process B-1. Total play time of the play list B-2. Play list determination as to whether the play list is on own apparatus or another apparatus (* duplicate of A-6)

B-3. Entry mark count and play list mark count in the play list (* duplicate of A-3).

FIG. 14 illustrates in detail information recorded on a marker private data area in the index file. The information of FIG. 14 corresponds to information A-1 through A-9 and B-1 through B03. In FIG. 14, the clip information file is described as clipinfo file.

In accordance with the arrangement of the present invention, the information required to perform the editing process, the playing process and the write-once recording process is recorded in the maker private data region within the index file and updated as necessary. As previously discussed, the record data in the index file is read by the information processing apparatus when the data recording medium loaded on the information processing apparatus is started. The read record data is then stored onto the memory (RAM) on the information processing apparatus. When one of the editing process and the playing process is performed or when the write-once recording process is performed, the required information is retrieved from the memory. Each of the write-once recording process, the editing process and the playing process is thus started quickly.

Described below are the update timing of information A-1 through A-9 and B-1 through B-3 and the reason why information A-1 through A-9 and B-1 through B-3 is required to perform each of the write-once recording process, the editing process and the playing process. In accordance with the arrangement of the present invention, each piece of information A-1 through A-9 and B-1 through B-3 as record information in the index file is updated along with updating of files having recorded each piece of the information in accordance with the AVCHD format.

The necessity of each piece of information A-1 through A-9 and B-1 through B-3 and the update timing thereof are described in terms of information types of 1-4 listed below.

1. Information used to determine whether data can be additionally write-once recorded on a last real play list (A-1 through A-6)

2. Information required to determine a file number of a newly generated file (A-7 through A-9)

3. Information required to calculate information regarding a play content to be shown to a user (B-1)

4. Information required to determine a play content to be shown to the user (B-2 and B-3)

(1. Information Used to Determine Whether Data can be Additionally Write-Once Recorded on a Last Real Play List (A-1 Through A-6))

The necessity of information A-1 through A-6, out of all information, namely,

A-1. File size of the playlist and clip information,

A-2. Play item count and sub-path count of the play list,

A-3. Entry mark count and play list mark count of the play list,

A-4. EP count in the clip information (fine EP and coarse EP),

A-5. Video attributes of the clip information (type, frame rate, aspect ratio and image size), and A-6. Play list determination as to whether the play list is on own apparatus or another apparatus, as information to determine whether data can be additionally write-once recorded on a last real play list and the update timing are described below.

<Necessity of Information>

Each pieces of information A-1 through A-6 is required as information to determine whether data can be additionally write-once recorded on a last real play list. As previously discussed with reference to FIG. 2, a real play list is a play list for an original title. The real play list is recorded in the order in which play items related to video streams photographed and recorded by the video camera are recorded. When new data is (write-once) recorded on the medium, the determination as to whether data can be additionally write-once recorded can be performed based on format restrictions, mounting restrictions and product specification restrictions.

The information used to determine whether data can be additionally write-once recorded is information A-1 through A-6. The information and the necessity thereof are described in detail below.

A-1. File Size of the Playlist and Clip Information

Each of the file size of the play list and the file size of the clip information recordable on the medium is subject to an upper limit in format.

The upper limit of the file size of the play list is 600 kB (kilobytes). If the upper limit of the file size of one clip information file is set to be 1 MB (megabytes), the upper limit of the file size of the sum of clip information files related to one play list file is 2 MB, for example.

To start the write-once recording process, the determination as to whether new data can be write-once recorded with these restrictions satisfied is performed. It is thus necessary to retrieve A-1. File size of the playlist and clip information. These pieces of information are stored among play list files or clip information files. To perform the write-once recording process, the information needs to be read from these files.

A-2. Play Item Count and Sub-Path Count of the Play List

To perform the write-once recording process, a determination as to whether recording using a play list as a write-once recording candidate is possible needs to be performed. Information required to perform the determination is a play item count and a sub-path count. These counts have respective upper limits in format. A determination process of whether recording using a play list as a write-once recording candidate is possible without exceeding the upper limit needs to be performed. These pieces of information are recorded in the play list file in accordance with the AVCHD format. To perform the write-once recording process, the information needs to be read from the play list file.

A-3. Entry Mark Count and Play List Mark Count of the Play List

A predetermined upper limit is set in a play list mark count permitted in a single play list file. The play list marks include an entry mark defining a chapter and a link point mark indicating a play start position not corresponding to a chapter. Upper limits are respectively set in the play list mark count and the entry mark count permitted to be present in a single play list file (for example, 999).

To perform the write-once recording process, a determination process of whether recording using a play list as a write-once recording candidate is possible without exceeding the upper limit needs to be performed. These pieces of information are recorded in the play list file in accordance with the AVCHD format. To perform the write-once recording process, the information needs to be read from the play list file.

A-4. EP Count in the Clip Information (Fine EP and Coarse EP)

In accordance with the AVCHD format, an upper limit is set on a total number of entry points (EPs) corresponding to the clip information files referenced from a single play list file.

The entry point (EP) is now briefly described. In an interframe encoded stream, such as an MPEG stream, a point from which a decode operation can be started is typically limited to a particular point such as a head of a GOP (Group Of Picture). To perform the playing process, start point information relating to the start point of the decode operation is needed. The head position of decode unit (head position of the GOP) is an entry point (EP).

In accordance with the AVCHD format, an upper limit is set in the total number of entry points (EPs) corresponding to clip information files referenced from a single play list file. To perform the write-once recording process, a determination as to whether recording using a play list as a write-once recording candidate is possible without exceeding the upper limit needs to be performed. These pieces of information are recorded in the play list file in accordance with the AVCHD format. To perform the write-once recording process, the information needs to be read from the play list file.

A-5. Video Attributes of the Clip Information (Type, Frame Rate, Aspect Ratio and Image Size)

The AVCHD format sets a restraint that video attributes of a plurality of clips match each other when the plurality of clips are referenced from a single play list file. When the write-once recording process is performed, it is necessary to determine whether a video attribute described in a play list file as a write-once recording candidate matches a video attribute of a clip to be newly recorded. The video attributes are information containing a record data type such as HD or SD, a frame rate, an aspect ratio and an image size.

In the AVCHD format, the video attribute of the clip is recorded in the clip information file. To perform the write-once recording process, a clip information file name is retrieved from a play list file as a write-once recording candidate, clip information of the retrieved clip information file name is retrieved and the video attribute of recorded data from the retrieved clip information is retrieved for verification.

A-6. Play List Determination as to Whether the Play List is on Own Apparatus or Another Apparatus A maker private data region is set up as a recording area for a maker of the apparatus performing data recording. Information unique to the maker is thus recorded on the maker private data region. In one restriction, if record information is present as maker private data of the play list file corresponding to data recorded on another apparatus, the record information must not be updated.

To perform the write-once recording process, it is necessary to determine whether maker private data recorded on the other apparatus is present in the play list file as a write-once recording candidate. Referencing the play list file needs to be performed for verification.

The information A-1 through A-6 needs to be verified when the write-once recording process is performed on a moving image in this way.

<Update Timing>

Each piece of information A-1 through A-6 is updated when the write-once recording process is performed on a moving image or when the editing process is performed. The update timings may occur as described below when the write-once recording process is performed or when the editing process is performed.

In the write-once recording process, all stream data is written subsequent to record ending, a database file specified as a formal storage destination of the information in accordance with the AVCHD format is updated. Information A-1 through A-6 in maker private data (MakersPrivateDate) in the index file is thus write-once recorded and updated.

In the editing process, the data base file specified as a formal storage destination of the information in accordance with the AVCHD format is updated subsequent to editing. Information A-1 through A-6 in maker private data (MakersPrivateDate) in the index file is thus write-once recorded and updated.

(2. Information Required to Determine a File Number of a Newly Generated File (A-7 Through A-9))

The necessity of information A-7 through A-9, out of the above-described information, namely, A-7. File number of the play list present on the medium, A-8. File number of the clip information present on the medium, and A-9. File number of the clip AV stream present on the medium, as information required to determine a file number of a newly generated file and the update timing are described below.

<Necessity of Information>

The generation of a new play list, clip information and clip AV stream file may be necessary when a moving image is write-once recorded or edited. For example, when a write-once recording process cannot be performed on a final play list, a new play list is required during the write-once recording of a moving image. As described above when one of the write-once recording process and the editing process is performed, a determination of whether the write-once recording process can be performed on a final real play list is performed.

When one file for one recording session is defined in device specifications or when no write-once recording process can be performed on the same file due to conditions such as video attributes, one of the new clip information and the clip AV stream file is required during the write-once recording process of the moving image.

One of the new clip information and the clip AV stream file is required during the write-once recording process of the moving image when the clip information and the clip AV stream file are separately set as a result of splitting a moving image, for example, or when a new play list needs to be set up. For example, a new play list needs to be set up when a entry mark for splitting is set or when a play item is split causing play list marks to exceed the upper limit thereof within the play list and play items to exceed the upper limit thereof within the play list.

When the generation of one of the new play list, the clip information and the clip AV stream file is required, it is necessary to set up a number as an identifier of one of the new play list, the clip information and the clip AV stream file to be generated. Since file number duplication with an existing file number is not permitted, a process for setting an unused file number is performed after checking the existing file numbers.

To perform the above-referenced process, the following information is required:

A-7. File number of the play list present on the medium,

A-8. File number of the clip information present on the medium and

A-9. File number of the clip AV stream present on the medium.

If data is valid, the clip information and the AV stream file are set in association with each other, and a file number of the clip information and a file number of the clip AV stream match with each other. The file number recorded in the index file becomes the file number of the play list and the file number of the clip information if the file is a valid data file.

However, in an invalid data file, the clip information file and the clip AV stream file are not paired, and the file numbers thereof are separately set up.

As FIG. 14 illustrates record data recorded in the index file, the clip information file and the file number of the clip AV stream file are separately recorded. In connection with the valid data, the file number of the play list and the file number of the clip information (=clip AV stream file number) are recorded.

<Update Timing>

Update timings of information A-7 through A-9 occur at the same timing as information A-1 through A-6 previously discussed. The write-once recording process and the editing process take the following timings.

In the case of the write-once recording process, all stream data is written subsequent to record ending, a database file specified as a formal storage destination of the information in accordance with the AVCHD format is updated. Information A-7 through A-9 in the maker private data (MakersPrivateDate) in the index file is thus write-once recorded and updated.

In the editing process, the data base file specified as a formal storage destination of the information in accordance with the AVCHD format is updated subsequent to editing. Information A-7 through A-9 in the maker private data (MakersPrivateDate) in the index file is thus write-once recorded and updated.

(3. Information Required to Calculate Information Regarding a Play Content to be Shown to a User (B-1))

The necessity of information B-1, out of the above-described information, namely, B-1. Total play time of the play list, as information required to calculate information of a play content to be shown to the user and the update timing are described below.

<Necessity of Information>

When a moving image recorded on a medium is played on a playing apparatus, a total play time from a head of the medium currently being played may be displayed on a display. When the medium is recognized on the playing apparatus, the total play time of a content on the medium may be displayed.

To process the above-described process, the play time of each play list recorded on the medium is needed. In accordance with the AVCHD format, the play time is recorded in the corresponding play list file. Without reading the play list file, the play time cannot be calculated in standard process.

In accordance with the arrangement of the present invention, information B-1. Total play time of the play list is recorded in the index file.

With this data recording structure, the playing apparatus can acquire the play time of the play list other than the play list being played and read without the need for reading these play list files. More specifically, during the playing of the moving image or at the recognition of the medium, the total play time can be displayed based on the information recorded in the index file.

<Update Timing>

The play time of the play list needs to be updated when one of the write-once recording process and the editing process is performed. A data update timing of [B-1. Total play time of the play list] recorded in the index file is at the end of each of the write-once recording process and the editing process like the update timing of each piece of the above-described information A-1 through A-6.

(4. Information Required to Determine a Play Content to be Shown to the User (B-2 and B-3))

The necessity of information B2 through B-3, out of the above-described information, namely, B-2. Play list determination as to whether the play list is on own apparatus or another apparatus (* duplicate of A-6) and B-3. Entry mark count and play list mark count in the play list (* duplicate of A-3), as information required to determine a play content to be shown to the user and the update timing are described below.

<Necessity of Information>

Depending on a playing application performed by the playing apparatus, the playing apparatus displays a content with all chapters displayed rather than on a per title basis when the content on the medium is displayed. The number of entry marks (=chapters) within the play list is not known without analyzing the play list file. When the chapters are displayed side by side, chapters to be displayed on a page cannot be determined without determining the number of chapters by analyzing all play lists.

Also depending on a playing application performed by the playing apparatus, a play list file recorded on another playing apparatus and having a plurality of chapters is displayed as a play list having only one chapter. Such a playing application cannot determine a chapter to be displayed on each page without knowing whether a play list is recorded on own playing apparatus or the other playing apparatus. Such information cannot be obtained without analyzing the play list.

The playing apparatus thus needs B-2. Play list determination as to whether the play list is on own apparatus or another apparatus and B-3. Entry mark count and play list mark count in the play list.

In the arrangement of the present invention, information B-2 and B-3 is recorded in the index file.

With this data recording structure, the playing apparatus can retrieve the play time of the play list other than the play list being played and read without the need for reading the play list file. More specifically, the total play time is displayed based on information recorded in the index file at the moving image playing or at the medium recognition.

<Update Timing>

At the recognition of the medium, a recording apparatus analyzes each play list and retrieves, from the play list file, B-2. Play list determination as to whether the play list is on own apparatus or another apparatus and B-3. Entry mark count and play list mark count in the play list, and stores the retrieved information into the index file. The information may be later updated when one of the write-once recording process and the editing process is performed. Such updating process is performed at the same timing as the update timing of the previously discussed information A-1 through A-6.

[4. Data Processing Sequence]

Figure 15:
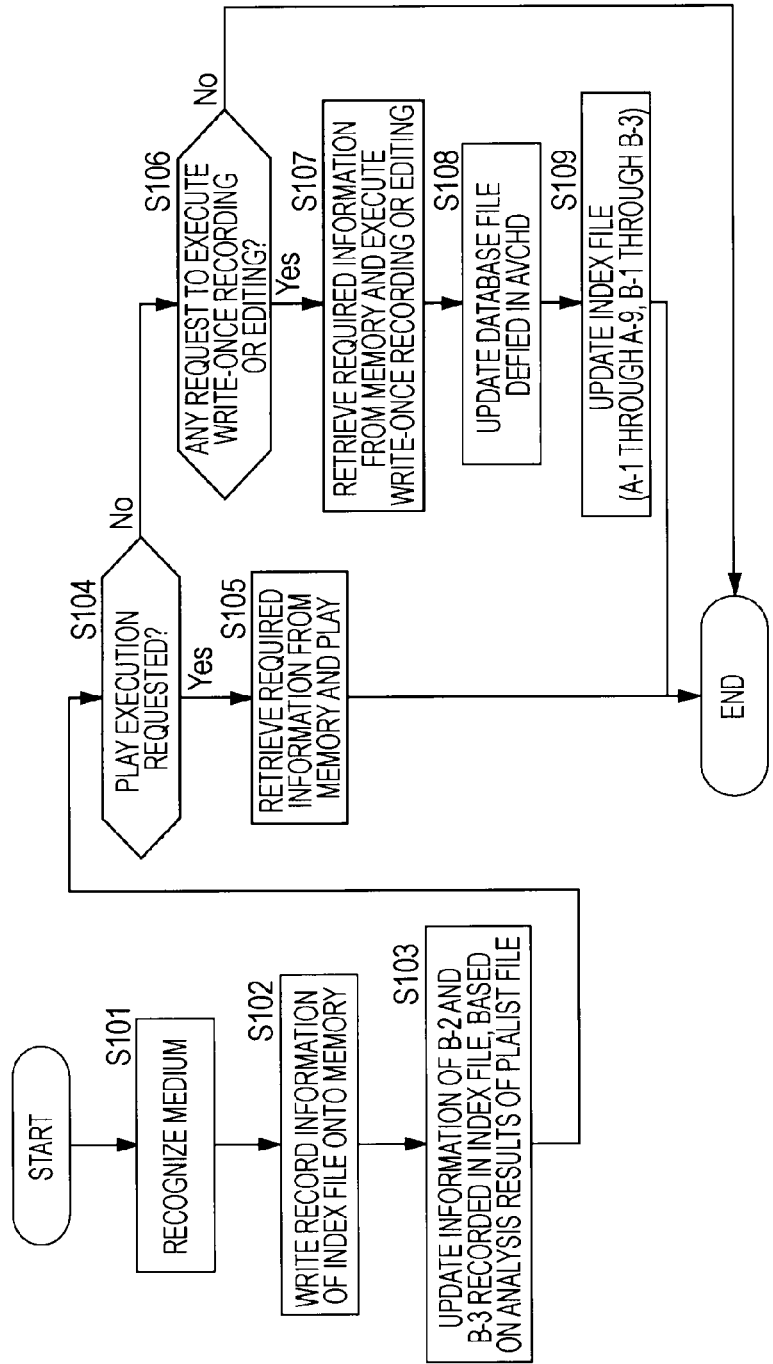
FIG. 15 is a flowchart illustrating a data process sequence of the information processing apparatus.

Described below with reference to a flowchart of FIG. 15 are processes (the playing process, the write-once recording process and the editing process) using the record information in the index file performed by the information processing apparatus and an update process of the index file, each performed in a process defined in the above-described [3. Management information recording structure of an index file].

The flowchart of FIG. 15 shows the process sequence of the apparatus that records data in accordance with the above-described AVCHD format and also can perform each of the record data playing process, the record data editing process and the record data write-once recording process. For example, the process represented by the flowchart of FIG. 15 is performed under the control of the recording and play controller 110 in the apparatus of FIG. 1.

Upon recognizing in step S101 a medium that can record and play data, the recording and play controller 110 writes in step S102 information written on the index file of database files recorded on the medium onto a memory on the information processing apparatus. The memory is the RAM 113 shown in FIG. 1, for example. Through these steps, the following data recorded on the maker private data region in the index file is read and then written onto the memory:

A. Information required to perform the write-once recording process and the editing process A-1. File size of the playlist and clip information A-2. Play item count and sub-path count of the play list A-3. Entry mark count and play list mark count of the play list A-4. EP count in the clip information (fine EP and coarse EP)

A-5. Video attributes of the clip information (type, frame rate, aspect ratio and image size)

A-6. Play list determination as to whether the play list is on own apparatus or another apparatus A-7. File number of the play list present on the medium A-8. File number of the clip information present on the medium A-9. File number of the clip AV stream present on the medium B. Information required to perform the playing process B-1. Total play time of the play list B-2. Play list determination as to whether the play list is on own apparatus or another apparatus (* duplicate of A-6)

B-3. Entry mark count and play list mark count in the play list (* duplicate of A-3).

In step S103, the recording and play controller 110 retrieves B-1. Total play time of the play list and B-2. Play list determination as to whether the play list is on own apparatus or another apparatus (* duplicate of A-6) by analyzing the play list file recorded on the medium. Based on the retrieved information, the recording and play controller 110 updates corresponding information recorded in the index file and corresponding information within the memory. If there is no change in the information, no updating is required.

In step S104, the recording and play controller 110 determines the presence or absence of a play execution request. If it is determined in step S104 that a play execution request has been issued, the recording and play controller 110 retrieves, in step S105 from the memory, information required to perform the playing process, namely, B. Information required to perform the playing process including B-1. Total play time of the play list, B-2. Play list determination as to whether the play list is on own apparatus or another apparatus, and B-3. Entry mark count and play list mark count in the play list, and then performs the playing process.

In the arrangement of the present invention, information B-1 through B-3 required to perform the playing process is retrieved by acquiring, from the memory, information read at the startup of the medium and the playing process is quickly started up.

In step S106, the recording and play controller 110 determines the presence or absence of an execution request of one of the write-once recording process and the editing process. If it is determined in step S106 that an execution request of one of the write-once recording process and the editing process has been issued, the recording and play controller 110 retrieves, in step S107 from the memory, information required to perform one of the write-once recording process and the editing process, namely, the following information:

A-1. File size of the playlist and clip information,

A-2. Play item count and sub-path count of the play list,

A-3. Entry mark count and play list mark count of the play list,

A-4. EP count in the clip information (fine EP and coarse EP),

A-5. Video attributes of the clip information (type, frame rate, aspect ratio and image size), A-6. Play list determination as to whether the play list is on own apparatus or another apparatus, A-7. File number of the play list present on the medium, A-8. File number of the clip information present on the medium, and A-9. File number of the clip AV stream present on the medium and performs one of the write-once recording process and the editing process.

In accordance with the arrangement of the present invention, information A-1 through A-9 required to perform one of the write-once recording process and the editing process is retrieved by acquiring, from the memory, information read at the startup of the medium. One of the write-once recording process and the editing process is thus quickly started up.

Upon completing one of the write-once recording process and the editing process in step S107, the recording and play controller 110 proceeds to step S108. The recording and play controller 110 updates the database files recorded in accordance with the AVCHD format. Data updating necessitated as a result of one of the write-once recording process and the editing process is performed on the play list file and the clip information file. Processing proceeds to step S109. The information A-1 through A-9 and B-1 through B-3 recorded in the index file is then updated.

The information processing apparatus of the present invention under the control of the controller performs the playing process and the editing process on the record data on the medium (information recording medium), records, in the index file, the information to be referenced in the data write-once recording process and updates the information in accordance with the updating of the record data. Since the index file information is written onto the memory (PAM) on the apparatus at the startup of the medium, the required information is immediately retrieved from the information recorded on the memory when the apparatus starts one of the playing process, the editing process and the write-once recording process. This arrangement eliminates the need for accessing the individual play list file and clip information file and retrieving the required information. Each of the playing process, the editing process and the write-once recording process can be quickly started.

As previously discussed, the flowchart of FIG. 15 shows a single process sequence of the apparatus that performs each of the record data playing process, the record data editing process and the write-once recording process. The sequence is shown for exemplary purposes only. For example, the apparatus performing the playing process may be designed to perform only steps S101→S102→S104→S105. In such a case, the record information on the index file is applied as the information required to perform the playing process.

An apparatus that performs one of the record data editing process and the write-once recording process may skip steps S104 and S105. In such a case as well, the record information on the index file is applied as the information required to perform the playing process and the editing process.

The present invention has been described with reference to the particular embodiments. It is obvious to any person of ordinary skill in the art that modifications and changes are possible without departing from the scope of the present invention. The embodiments of the present invention have been discussed for exemplary purposes only and are not intended to limit the present invention. The scope of the invention is determined solely by reference to the claims appended hereto.

The series of process steps described above may be performed using hardware, software or a combination of both. If the process steps are performed using software, a program recording a process sequence of the software may be installed onto a memory in a computer in dedicated hardware or may be installed onto a general-purpose computer that performs a variety of processes.

The program may be pre-stored on a hard disk or a ROM (Read Only Memory), each as a recording medium. Alternatively, the program may be temporarily or permanently stored (recorded) on a removable disk such as a flexible disk, a CD-ROM (Compact Disk Read Only Memory), an MO (Magneto optical) disk, a DVD (Digital Versatile Disk), a magnetic disk or a semiconductor memory. Such a removable recording medium may be supplied as so-called package software.

The program may be installed from such a removable medium to a computer. Alternatively, the program may be transferred from a download site in a wireless fashion to the computer or in a wired fashion to the computer via a network such as a LAN (Local Area Network) or the Internet. The computer then receives the transferred program and installs the received program onto a recording medium such as a built-in hard disk.

The variety of processes described in this specification is performed not only in a time-series order as described above but also in parallel or separately depending on a throughput of the apparatus performing each process. In this specification, the term system refers to a logical set of a plurality of apparatuses and elements of each apparatus are not necessarily housed in a single casing.

Industrial Applicability

In accordance with one embodiment of the present invention, when data is recorded in a data recording format having a layered management structure such as an AVCHD format, the identification information required to perform one of the record data playing process, the record data editing process, and the information recording medium data write-once recording process is stored in the index file containing index information of the record data. This arrangement eliminates the need for retrieval of information from a variety of files when one of the playing process, the editing process and the write-once recording process is performed. One of the playing process, the editing process and the write-once recording process is thus quickly performed.

The invention claimed is:

1. An information processing apparatus, comprising:
a controller configured to perform data recording process control on an information recording medium,
wherein the controller is configured to perform data recording control in accordance with a data recording format having a predetermined layered management structure, to store, among other information in an index file of index information of record data, identification information, and to record the index file with the identification information stored therewithin onto the information recording medium, the identification information being required to perform at least one of a playing process on the record data, an editing process on the record data, and a write-once recording process on data on the information recording medium, wherein the same identification information recorded in the index file is also recorded in one of a playlist file and a clip information file, each defined in the data recording format having the predetermined layered management structure,
wherein the identification information comprises information required to perform the playing process on the record data, the identification information including a total play time of the playlist, determination results as to whether the playlist is on own apparatus or another apparatus, and the numbers of entry marks and playlist marks of the playlist.

2. The information processing apparatus according to claim 1, wherein the controller performs an update process of the identification information in response to updating of data recorded on the information recording medium.

3. The information processing apparatus according to claim 2, wherein the controller performs the update process of the identification information subsequent to one of the editing process on the data recorded on the information recording medium and the write-once recording process on data to the information recording medium.

4. The information processing apparatus according to claim 1, wherein the identification information is information selected from information recorded in an attribute information file storing attribute information defined in the data recording format having the layered management structure.

5. The information processing apparatus according to claim 1, wherein the identification information comprises information required to perform one of the editing process on the record data and the write-once recording process on the data to the information recording medium, the identification information including a file size of each of a playlist and clip information, the numbers of playitems and sub paths of the playlist, the numbers of entry marks and playlist marks of the playlist, the number of entry points (EPs) of the clip information, a video attribute of the clip information, determination results as to whether the playlist is on own apparatus or another apparatus, a file number of the playlist recorded on the information recording medium, a file number of the clip information recorded on the information recording medium, and a file number of a clip AV stream recorded on the information recording medium.

6. The information processing apparatus according to claim 1, wherein in the write-once recording process on the data to the information recording medium, the controller references the identification information retrieved from the index file and stored on a memory of the information processing apparatus and then performs at least one of a determination process of whether to perform the write-once recording process and a determination process of determining a mode of the write-once recording process.

7. The information processing apparatus according to claim 1, wherein in the editing process of the data recorded on the information recording medium, the controller references the identification information retrieved from the index file and stored on a memory of the information processing apparatus and then performs at least one of a determination process of whether to perform the editing process and a determination process of determining a mode of the editing process.

8. The information processing apparatus according to claim 1, wherein in the playing process of the data recorded on the information recording medium, the controller references the identification information retrieved from the index file and stored on a memory of the information processing apparatus and then performs a process of retrieving information to be applied to the playing process.

9. The information processing apparatus according to claim 1, wherein the data recording format having the layered management structure is an AVCHD format.

10. An information processing apparatus, comprising:

a controller configured to control one of a playing process and an editing process on data recorded on an information recording medium, wherein the controller is configured to perform one of the playing process and the editing process on the data by reading from the information recording medium the data recorded in accordance with a data recording format having a predetermined layered management structure, to read, from an index file of index information of record data, information required to perform at least one of the playing process on the record data and the editing process on the record data, to store the read information onto a memory of the information processing apparatus, and to perform one of the data playing process and the data editing process by referencing the information stored on the memory, wherein the same information read from the index file is also recorded in one of a playlist file and a clip information file, each defined in the data recording format having the predetermined layered management structure, wherein the information comprises information required to perform the playing process on the record data, the information including a total play time of the playlist, determination results as to whether the playlist is on own apparatus or another apparatus, and the numbers of entry marks and playlist marks of the playlist.

11. The information processing apparatus according to claim 10, wherein the data recording format having the layered management structure is an AVCHD format.

12. An information processing method of an information processing apparatus that includes a controller configured to perform data recording control in accordance with a data recording format having a predetermined layered management structure, the method comprising:

storing, among other identification information in an index file of index information of record data, identification information, and recording the index file with the identification information stored therewithin onto the information recording medium, the identification information being required to perform one of a playing process on the record data, an editing process one the record data and a write-once recording process on data on the information recording medium, wherein the same identification information recorded in the index file is also recorded in one of a playlist file and a clip information file, each defined in the data recording format having the predetermined layered management structure, wherein the identification information comprises information required to perform the playing process on the record data, the identification information including a total play time of the playlist, determination results as to whether the playlist is on own apparatus or another apparatus, and the numbers of entry marks and playlist marks of the playlist.

13. The information processing method according to claim 12, wherein the controller performs an update process of the identification information in response to updating of data recorded on the information recording medium.

14. The information processing method according to claim 13, wherein the controller performs the update process of the identification information subsequent to one of the editing process on the date recorded on the information recording medium and the write-once recording process on data to the information recording medium.

15. The information processing method according to claim 12, wherein the identification information is information selected from information recorded in an attribute information file storing attribute information defined in the data recording format having the layered management structure.

16. The information processing method according to claim 12, wherein the identification information comprises information required to perform one of the editing process on the record data and the write-once recording process on the data to the information recording medium, the identification information including
 a file size of each of a playlist and clip information,
 the numbers of playitems and sub paths of the playlist,
 the numbers of entry marks and playlist marks of the playlist,
 the number of entry points (EPs) of the clip information,
 a video attribute of the clip information,
 determination results as to whether the playlist is on own apparatus or another apparatus,
 a file number of the playlist recorded on the information recording medium,
 a file number of the clip information recorded on the information recording medium, and
 a file number of a clip AV stream recorded on the information recording medium.

17. The information processing method according to claim 12, wherein in the write-once recording process on the data to the information recording medium, the controller references the identification information retrieved from the index file and stored on a memory of the information processing apparatus and then performs at least one of a determination process of whether to perform the write-once recording process and a determination process of determining a mode of the write-once recording process.

18. The information processing method according to claim 12, wherein in the editing process of the data recorded on the information recording medium, the controller references the identification information retrieved from the index file and stored on a memory of the information processing apparatus and then performs at least one of a determination process of whether to perform the editing process and a determination process of determining a mode of the editing process.

19. The information processing method according to claim 12, wherein in the playing process of the data recorded on the information recording medium, the controller references the identification information retrieved from the index file and stored on a memory of the information processing apparatus and then performs a process of retrieving information to be applied to the playing mode.

20. The information processing method according to claim 12, wherein the data recording format having the layered management structure is an AVCHD format.

21. An information processing method of an information processing apparatus that includes a controller configured to perform one of a playing process and an editing process on data by reading from an information recording medium the data recorded thereon in accordance with a data recording format having a predetermined layered management structure, the method comprising:
 reading, from an index file of index information of record data, information required to perform at least one of the playing process on the record data and the editing process on the record data;
 storing the read information onto a memory; and
 performing one of the playing process and the editing process by referencing the information stored on the memory, wherein the same information read from the index file is also recorded in one of a playlist file and a clip information file, each defined in the data recording format having the predetermined layered management structure,
 wherein the information comprises information required to perform the playing process on the record data, the information including
 a total play time of the playlist,
 determination results as to whether the playlist is on own apparatus or another apparatus, and
 the numbers of entry marks and playlist marks of the playlist.

22. The information processing method according to claim 21, wherein the data recording format having the layered management structure is an AVCHD format.

23. A non-transitory computer-readable medium storing a computer program that when executed by an information processing apparatus, causes the information processing apparatus to perform a method, wherein a controller of the information processing apparatus is configured to perform data recording control in accordance with a data recording format having a predetermined layered management structure, the method comprising:
 storing, among other information in an index file of index information of record data, identification information, and recording the index file with the identification information stored therewithin onto the information recording medium, the identification information being required to perform at least one of a playing process on the record data, an editing process on the record data and a write-once recording process on data to the information recording medium, wherein the same identification information recorded in the index file is also recorded in one of a playlist file and a clip information file, each defined in the data recording format having the predetermined layered management structure,
 wherein the identification information comprises information required to perform the playing process on the record data, the identification information including
 a total play time of the playlist,
 determination results as to whether the playlist is on own apparatus or another apparatus, and
 the numbers of entry marks and playlist marks of the playlist.

24. A non-transitory computer-readable medium storing a computer program that when executed by an information processing apparatus, cause the information processing apparatus to perform a method, wherein a controller of the information processing apparatus is configured to perform one of a playing process and an editing process on data by reading from the information recording medium the data recorded in accordance with a data recording format having a predetermined layered management structure, the method comprising:
 reading, from an index file of index information of record data, information required to perform at least one of the playing process on the record data and the editing process on the record data;
 storing the read information onto a memory; and
 performing one of the data playing process and the data editing process by referencing the information stored on the memory, wherein the same information read from the index file is also recorded in one of a playlist file and a clip information file, each defined in the data recording format having the layered management structure, wherein the information comprises information required to perform the playing process on the record data, the information including a total play time of the playlist, determination results as to whether the playlist is on own apparatus or another apparatus, and the numbers of entry marks and playlist marks of the playlist.

* * * * *